(12) United States Patent
Ding

(10) Patent No.: US 12,398,575 B2
(45) Date of Patent: Aug. 26, 2025

(54) CENTER POLE FIXING STRUCTURE

(71) Applicant: Aftercloud Technology Co., Ltd, Fujian (CN)

(72) Inventor: Shunfeng Ding, Fujian (CN)

(73) Assignee: Aftercloud Technology Co., Ltd, Fujian (CN)

( * ) Notice: Subject to any disclaimer, the term of this patent is extended or adjusted under 35 U.S.C. 154(b) by 104 days.

(21) Appl. No.: 18/334,384

(22) Filed: Jun. 14, 2023

(65) Prior Publication Data
US 2024/0060325 A1     Feb. 22, 2024

(30) Foreign Application Priority Data

Aug. 22, 2022   (CN) .......................... 202222206211.3
Dec. 1, 2022    (CN) .......................... 202223209996.6
Feb. 21, 2023   (CN) .......................... 202320275047.3

(51) Int. Cl.
*E04H 12/22*     (2006.01)

(52) U.S. Cl.
CPC ................................ *E04H 12/2269* (2013.01)

(58) Field of Classification Search
CPC . E04H 12/22; E04H 12/2223; E04H 12/2238; E04H 12/2269; E01F 13/026
See application file for complete search history.

(56) References Cited

U.S. PATENT DOCUMENTS

| 1,193,252 | A | * | 8/1916 | Freeman | H01R 33/46 |
| | | | | | 439/551 |
| 3,225,501 | A | * | 12/1965 | McCaron | E01F 15/06 |
| | | | | | 52/298 |
| 3,966,340 | A | * | 6/1976 | Morris | F16B 12/22 |
| | | | | | 248/188.8 |
| 4,718,624 | A | * | 1/1988 | Greulich | H04R 1/08 |
| | | | | | 248/291.1 |
| 5,037,232 | A | * | 8/1991 | Pakdipanichpong | B60P 3/36 |
| | | | | | 108/150 |
| 5,121,891 | A | * | 6/1992 | Goldsmith | F16B 9/056 |
| | | | | | 108/150 |
| 5,383,644 | A | * | 1/1995 | Huse | F16M 11/041 |
| | | | | | 248/501 |

(Continued)

FOREIGN PATENT DOCUMENTS

| AU | 2010100935 A4 | * | 11/2010 | ............ E01F 13/026 |
| CH | 338567 A | * | 5/1959 | |
| FR | 2705717 A3 | * | 12/1994 | ............ E01F 13/026 |

*Primary Examiner* — Eret C McNichols

(57) ABSTRACT

Disclosed is a center pole fixing structure, including a center pole and a base. The base is provided with a center hole. The center pole is inserted into the center hole to be fixed. An anti-disengagement fixing structure is formed between the center pole and the base, achieves fixing by relative rotation of the center pole and the base, and constrains movement of the center pole in an axial direction thereof. A stopper for constraining the rotation of the center pole is disposed between the center pole and the base. The stopper is a movable pin, and the movable pin is controlled to enter or exit, thereby locking or unlocking the relative rotation of the center pole and the base. According to the disclosure, the center pole and the base are convenient to mount and dismount, and the fixed structure is firm and stable.

19 Claims, 28 Drawing Sheets

(56) References Cited

U.S. PATENT DOCUMENTS

| | | | | |
|---|---|---|---|---|
| 5,553,833 | A * | 9/1996 | Bohen | E01F 13/026 256/19 |
| 5,697,190 | A * | 12/1997 | Scribner | E04H 12/2261 52/165 |
| 5,826,850 | A * | 10/1998 | Goldsmith | B63B 29/06 108/150 |
| 6,820,847 | B2 * | 11/2004 | Camarota | A47B 13/023 108/150 |
| 7,055,807 | B2 * | 6/2006 | Pesta | E04H 12/2269 52/297 |
| 7,431,259 | B2 * | 10/2008 | Tung | E04H 12/2284 248/521 |
| 7,784,761 | B2 * | 8/2010 | Ma | E04H 12/2238 403/104 |
| 7,836,902 | B2 * | 11/2010 | Tung | A45B 23/00 248/521 |
| 8,807,513 | B2 * | 8/2014 | Volin | A45B 23/00 248/521 |
| 8,827,231 | B1 * | 9/2014 | Blair | E04H 12/22 52/698 |
| 9,719,272 | B1 * | 8/2017 | Torsiello, Jr. | E01F 9/629 |
| 9,763,508 | B2 * | 9/2017 | Reishus | A45D 34/04 |
| 9,957,728 | B2 * | 5/2018 | Ma | A45B 23/00 |
| 10,024,075 | B2 * | 7/2018 | McDowell | E04B 5/026 |
| 10,287,793 | B1 * | 5/2019 | Anslem | E04H 12/2269 |
| 10,641,002 | B2 * | 5/2020 | Szmyr | E04H 12/2269 |
| 10,918,203 | B1 * | 2/2021 | Schneider | H01R 33/05 |
| 11,304,509 | B2 * | 4/2022 | Schneider | F16B 12/10 |
| 11,490,727 | B2 * | 11/2022 | Lu | F16B 21/02 |
| 12,108,872 | B2 * | 10/2024 | Schneider | A47B 13/021 |
| 2005/0285092 | A1 * | 12/2005 | Pesta | E04H 12/2269 256/65.14 |
| 2008/0111046 | A1 * | 5/2008 | Tung | A45B 17/00 248/521 |
| 2011/0290171 | A1 * | 12/2011 | Brick | G09F 17/00 116/173 |
| 2013/0192149 | A1 * | 8/2013 | Roach | E01F 13/026 52/165 |
| 2021/0317622 | A1 * | 10/2021 | Freire Falcao Teles Caramelo | E04H 12/2269 |
| 2023/0003047 | A1 * | 1/2023 | Hostert | A47B 37/04 |

* cited by examiner (a)

(b)

(a)

(b)

(a)

(b)

(a)

(b)

(a)

(d)

CENTER POLE FIXING STRUCTURE

CROSS-REFERENCE TO RELATED APPLICATION

This application claims the priority benefit of Chinese application serial no. 202223209996.6, filed on Dec. 1, 2022, Chinese application serial no. 202320275047.3, filed on December Feb. 21, 2023, and Chinese application serial no. 202222206211.3, filed on Aug. 22, 2022. The entirety of the above-mentioned patent application is hereby incorporated by reference herein and made a part of this specification.

BACKGROUND

Technical Field

The present disclosure relates to the field of outdoor umbrellas, and particularly relates to a center pole fixing structure.

Description of Related Art

An outdoor umbrella is widely used in leisure places such as plazas, beaches, parks and courtyards as an outdoor leisure utensil, and provides people with a comfortable leisure and shading space. The outdoor umbrella may be not only effective for sun protection and sunshade, but also is more conducive to constant promotion due to its inexpensive outdoor commercial advertising use.

In general, the outdoor umbrella is composed of a collapsible umbrella body, a center pole and a base. The umbrella body is mounted on a top of the center pole and a bottom of the center pole is fixed on the base, wherein the center pole is generally square or round. In order to fix the center pole to the base, the existing outdoor umbrella is mostly fixed in a manner that one or more bolt pins pass through a center hole in the base to be locked with a screw/nut provided at the bottom of the center pole, or the center pole is directly inserted. The base is positioned using a bolt pin.

However, on the one hand, since the outdoor environment is complicated, and the outdoor umbrella is required to bear a large self-weight and variable loads caused by a use operation or other processes in addition to loads such as wind and rain, the center pole is prone to rotation, affecting the stability of the umbrella body. A gap is formed between the center pole and the base easily after long-term use, which results in a poor fixing effect between the center pole and the base, and produces wobbling, thereby causing safety hazards. Whereas, the wobbling of the center pole easily damages the thread of a bolt and even causes the deformation of each connecting structural part so as to often result in that the center pole cannot be disassembled normally. On the other hand, the base generally has a large weight, and massive stones serve as most of bases at present. Such an assembly is very inconvenient in operation, and wastes time and labor, and it is often required to lift the base to loosen the bolt during disassembly, thereby wasting time and labor.

Meanwhile, the out-of-roundness of an outer diameter of the center pole cannot be avoided during the production and manufacturing process, which results in decreased fitness degree of the center pole and the base to cause wobbling, further deteriorating the stability of the center pole. How to reinforce the firmness of the connection between the center pole and the base is the problem mainly to be solved by the present disclosure.

SUMMARY

The present disclosure aims to solve one of the technical problems in the above-mentioned technology at least to some extent. To this end, an objective of the present disclosure is to provide a center pole fixing structure, which enhances the firmness and stability of the connection between the center pole and the base while improving the disassembly efficiency of a center pole.

To achieve the above objective, an embodiment of the present disclosure provides a center pole fixing structure, including a center pole and a base, wherein the base is provided with a center hole, and the center pole is inserted into the center hole to be fixed. The center pole fixing structure is characterized in that, a matched anti-disengagement fixing structure is formed between the center pole and the base, achieves fixing by relative rotation of the center pole and the base, and constrains movement of the center pole in an axial direction thereof; a stopper for constraining the rotation of the center pole is disposed between the center pole and the base; and the stopper is a movable pin, and the movable pin is controlled to enter or exit, thereby locking or unlocking the relative rotation of the center pole and the base.

According to the center pole fixing structure in the embodiment of the present disclosure, a center pole of an outdoor umbrella is mounted and dismounted quickly and meanwhile, the center pole may be prevented from disengagement by using the matched anti-disengagement fixing structure disposed between the center pole and the base. The mounting stability and safety of the center pole are improved by constraining the rotation of the center pole by providing the stopper between the center pole and the base.

The center pole is constrained or unlocked by matching a hole or slot with the movable pin, thereby simplifying the manufacturing process and saving costs. The firmness of the center pole is further enhanced by the engagement of a flange ring on the outside of the center pole and a first flange or a support ring in the center hole, which prevents the center pole and the base from relative rotation to avoid disengagement, and well plays the roles of centering and wobbling resistance particularly when the fitness degree of the center pole and the base is reduced due to out-of-roundness of an outer diameter of the center pole or machining deformation.

By providing the transition jacket in the base, the centering and windproof effects of a tube body of the center pole is better by disposing a transition sleeve in the base. In addition, the same base may also satisfy center poles having different outer diameters by replacing transition sleeves having different inner diameters, thereby saving costs.

The present disclosure also allows for quick mounting and dismounting of the center pole. At the time of mounting, a downward pressing force is applied to the center pole after the center pole is inserted into the center hole to implement the connection of the anti-disengagement fixing structure. Meanwhile, the center pole extrudes an elastic locking pin, and then the center pole is rotated to clamp and lock the anti-disengagement fixing structure. The center pole is rotated until the elastic locking pin pops up to mount the center pole to the base. At the time of dismounting, the elastic locking pin is pulled outwards so that the elastic locking pin is withdrawn from a pin hole, and the center pole is rotated to unlock the anti-disengagement fixing structure, thereby separating the center pole from the base. The operation is simple and fast.

In addition, the center pole fixing structure provided according to the above embodiment of the present disclosure may also have the following additional technical features.

Optionally, the anti-disengagement fixing structure is an anti-disengagement toothed ring and an anti-disengagement locking tab. The anti-disengagement toothed ring is provided with an anti-disengagement catch having a shape structure adaptive to a shape structure of the anti-disengagement locking tab.

Further, when an anti-disengagement locking tab is provided on the base, when the anti-disengagement locking tab is disposed on the base, the anti-disengagement toothed ring is disposed at an end of the center pole inserted into the center hole, and the anti-disengagement toothed ring is integrally formed or detachably connected with the center pole.

Further, the anti-disengagement toothed ring is integrally formed or detachably connected with the base when disposed on the base. The anti-disengagement locking tab is disposed in an end surface or an inner cavity of a tube body of the center pole.

Optionally, the movable pin is an elastic telescopic pin, and the elastic telescopic pin is disposed on the base, and extends into a mating surface of the center pole and the base after the center pole and the base are in a rotation locking state to prevent the center pole and the base from rotation.

Further, an anti-movement device is cooperatively disposed between contact surfaces of the anti-disengagement toothed ring and the anti-disengagement locking tab.

Still further, the anti-movement device is a wedge or a bump or a ridge disposed between the contact surfaces.

Further, a mounting block is disposed in the center hole of the base, and is provided with the stopper, and the stopper is a hole or a slot. The anti-disengagement toothed ring or the anti-disengagement locking tab is disposed at the center of the mounting block.

Still further, a transition sleeve is embedded in the mounting block, and the transition sleeve is provided with a stopper mounting slot and a stop buckle. At the same time, the mounting block is provided with a stop hole or slot into which the stop buckle is inserted to prevent rotation of the transition sleeve.

Still further, a bottom plate of the mounting block is provided with an anti-wobbling ring.

Still further, a spacer is disposed between the mounting block and the base.

Optionally, a flange ring is fixed at the outside of the center pole. A first flange is locked and fixed at the center hole in the base by a plurality of screws, and an inner diameter of the first flange cooperates with an outer diameter of the flange ring of the center pole.

Further, a support ring is disposed under the first flange, and an end surface of the support ring cooperates with an end surface of the flange ring.

Still further, a compensatory backing ring is disposed under the support ring, and the compensatory backing ring employs an elastic material.

Optionally, the hole or slot is formed in an end of the center pole connected to the base.

Optionally, the movable pin is a telescopic pin, and the base is provided with a sliding slot in which the movable pin slides.

Optionally, the center pole is provided with a first anti-disengagement structure that cooperates with a second anti-disengagement structure on the base to form the anti-disengagement fixing structure.

Further, the first anti-disengagement structure is a hook or a thread, and the second anti-disengagement structure has a shape structure adaptive to a shape structure of the first anti-disengagement structure.

Further, the movable pin is an eccentric movable pin assembly.

Further, the elastic telescopic pin is an eccentric elastic telescopic pin assembly.

DESCRIPTION OF THE EMBODIMENTS

Figure 1:
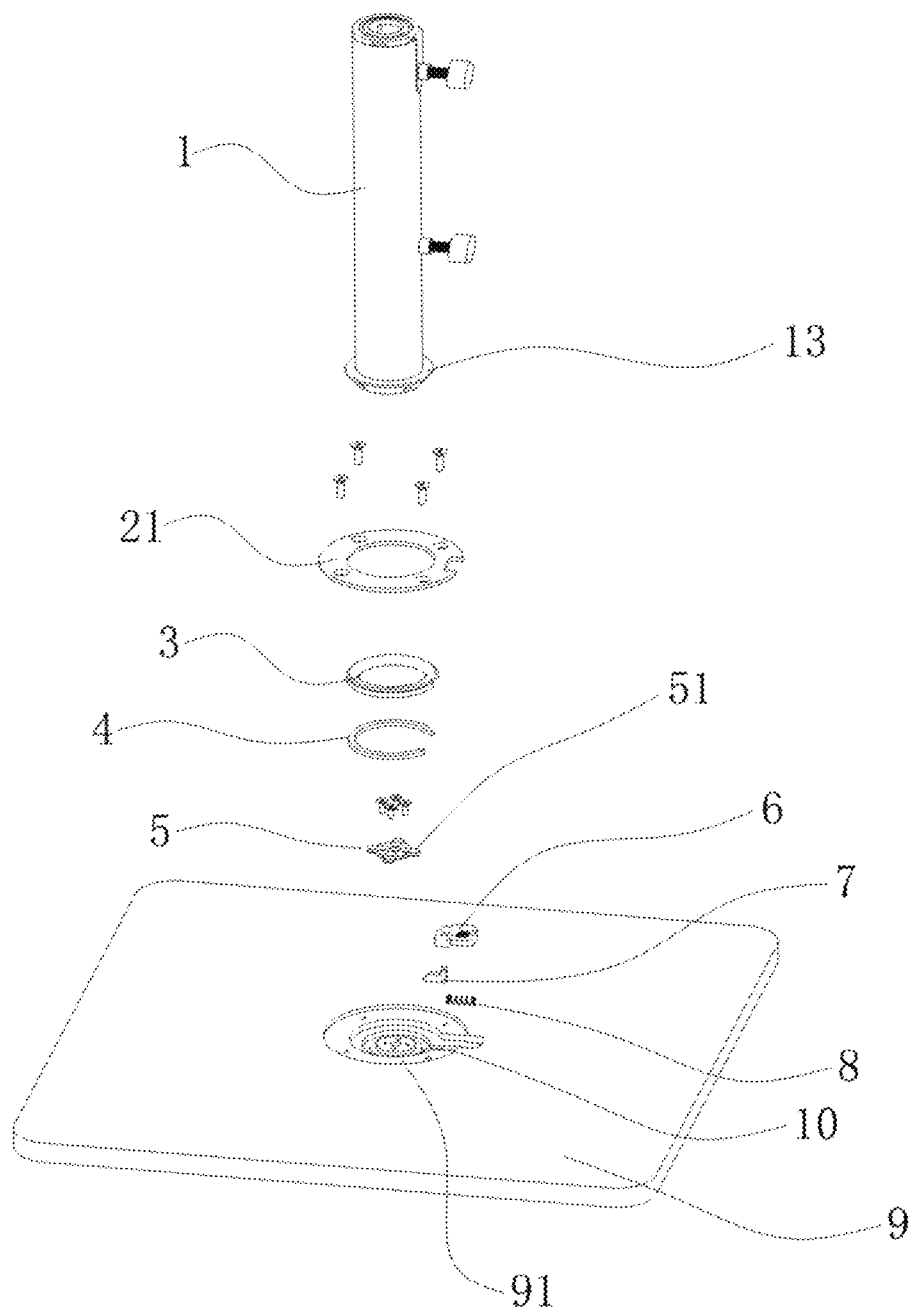
FIG. 1 is an exploded view of an overall structure according to an embodiment of the present disclosure.

Embodiments of the present disclosure are described in detail below, and examples of the embodiments are shown in the drawings, wherein the same or similar numerals throughout represent same or similar elements or elements having the same or similar functions. The embodiments described below with reference to the drawings are exemplary, and are intended to be used for explaining the present disclosure, and are not to be understood as limiting the present disclosure.

According to the present disclosure, a center pole of an outdoor umbrella is mounted and dismounted quickly and meanwhile, the center pole may be prevented from disengagement by using a matched anti-disengagement fixing structure disposed between the center pole and a base. The mounting stability and safety of the center pole are improved by constraining the rotation of the center pole by providing a stopper between the center pole and the base.

The center pole is constrained or unlocked by matching a hole or slot with the movable pin, thereby simplifying the manufacturing process and saving costs. The firmness of the center pole is further enhanced by the engagement of a flange ring on the outside of the center pole and a first flange or a support ring in the center hole, which prevents the center pole and the base from relative rotation to avoid disengagement, and well plays the roles of centering and wobbling resistance particularly when the fitness degree of the center pole and the base is reduced due to out-of-roundness of an outer diameter of the center pole or machining deformation.

By providing the transition jacket in the base, the centering and windproof effects of a tube body of the center pole is better by disposing a transition sleeve in the base. In addition, the same base may also satisfy center poles having different outer diameters by replacing transition sleeves having different inner diameters, thereby saving costs.

The present disclosure also allows for quick mounting and dismounting of the center pole. At the time of mounting, a downward pressing force is applied to the center pole after the center pole is inserted into the center hole to implement the connection of the anti-disengagement fixing structure. Meanwhile, the center pole extrudes an elastic locking pin, and then the center pole is rotated to clamp and lock the anti-disengagement fixing structure. The center pole is rotated until the elastic locking pin pops up to mount the center pole to the base. At the time of dismounting, the elastic locking pin is pulled outwards so that the elastic locking pin is withdrawn from a pin hole, and the center pole is rotated to unlock the anti-disengagement fixing structure, thereby separating the center pole from the base. The operation is simple and fast.

In order to better understand the above technical solutions, exemplary embodiments of the present disclosure will be described in more detail below with reference to the drawings. Although the exemplary embodiments of the present disclosure are illustrated in the drawings, it should be understood that the present disclosure may be implemented in various forms and should not be construed as being limited to the embodiments set forth herein. On the contrary, these embodiments are provided such that the present disclosure will be more thoroughly understood, and the scope of the present disclosure may be fully conveyed to those skilled in the art.

In order to better understand the above technical solutions, the above technical solutions will be described in detail in conjunction with the drawings and specific embodiments of the present disclosure.

Figure 2:
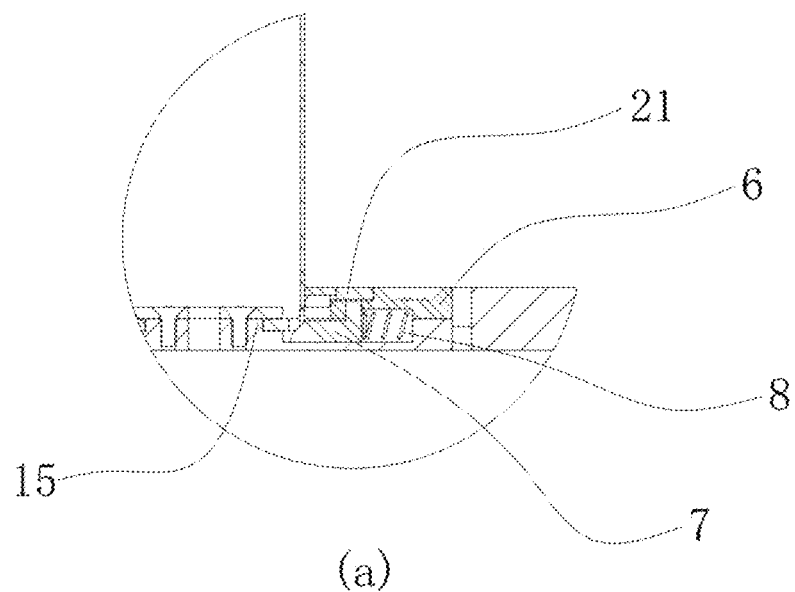
FIG. 2 is a partial section view showing the dismounting of a center pole according to an embodiment of the present disclosure.
Figure 2:
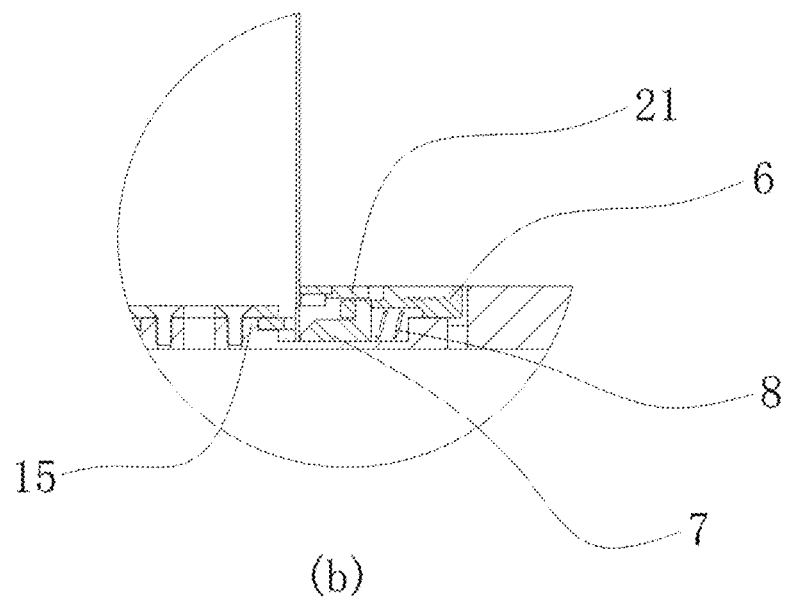

According to an embodiment of the present disclosure as shown in FIG. 1 to FIG. 2, a center pole fixing structure includes a center pole 1 and a base 9, wherein the center pole 1 is a steel tube body, and the base 9 is provided with a center hole 91. A matched anti-disengagement fixing structure is disposed between the center pole 1 and the base 9, achieves fixing by relative rotation of the center pole 1 and the base 9, and constrains movement of the center pole 1 in an axial direction thereof. A stopper for constraining the rotation of the center pole is disposed between the center pole 1 and the base 9.

The anti-disengagement fixing structure includes an anti-disengagement toothed ring 5 and an anti-disengagement locking tab 1712. The anti-disengagement toothed ring 5 is provided with an anti-disengagement catches 51 (see FIGS. 1, 3, 6, 7, 11, 13, 18 and 24) having a shape structure adaptive to a shape structure of the anti-disengagement locking tab 1712. The stopper may be an elastic locking pin or a detachable movable bolt pin.

Figure 5:
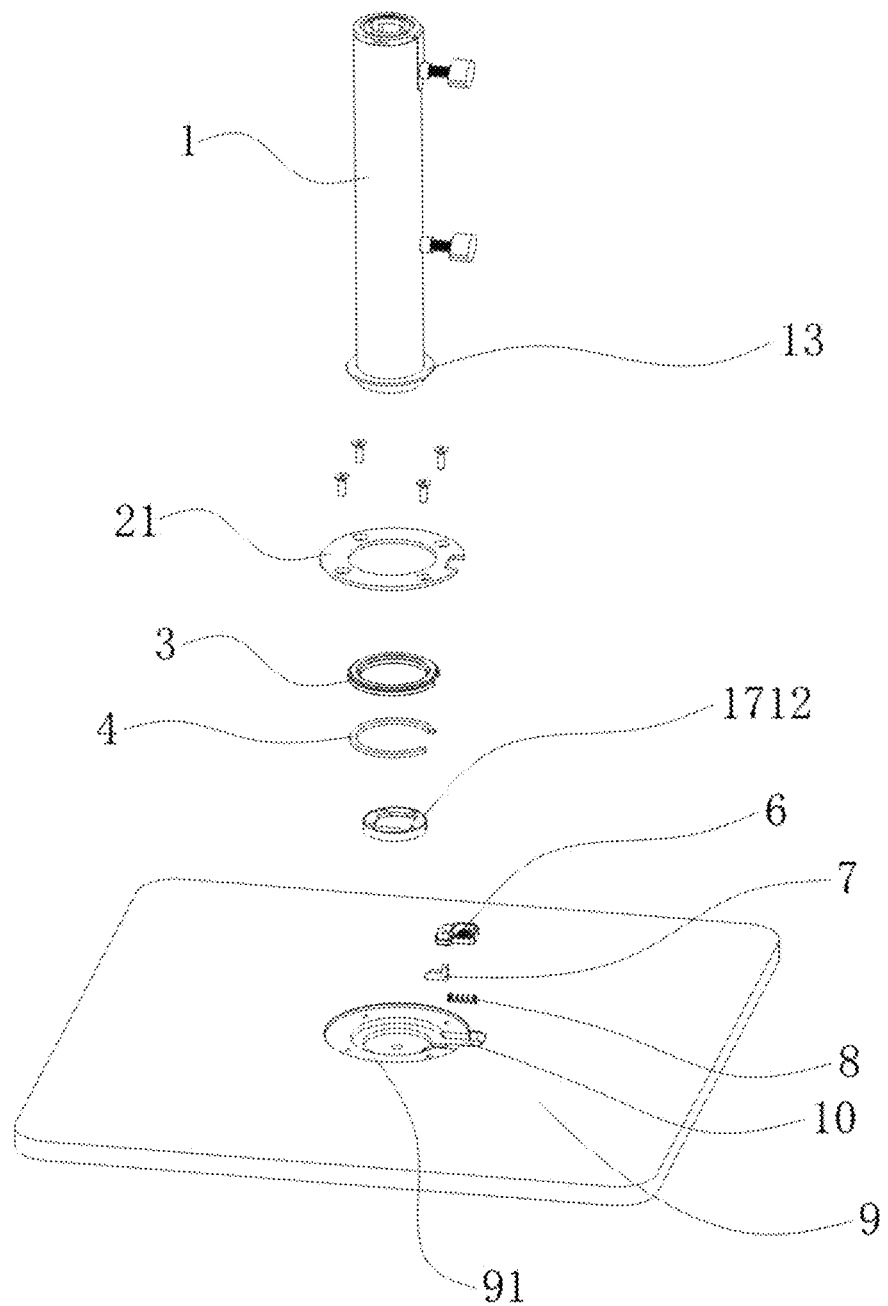
FIG. 5 is an exploded view of an overall structure according to yet another embodiment of the present disclosure.
Figure 11:
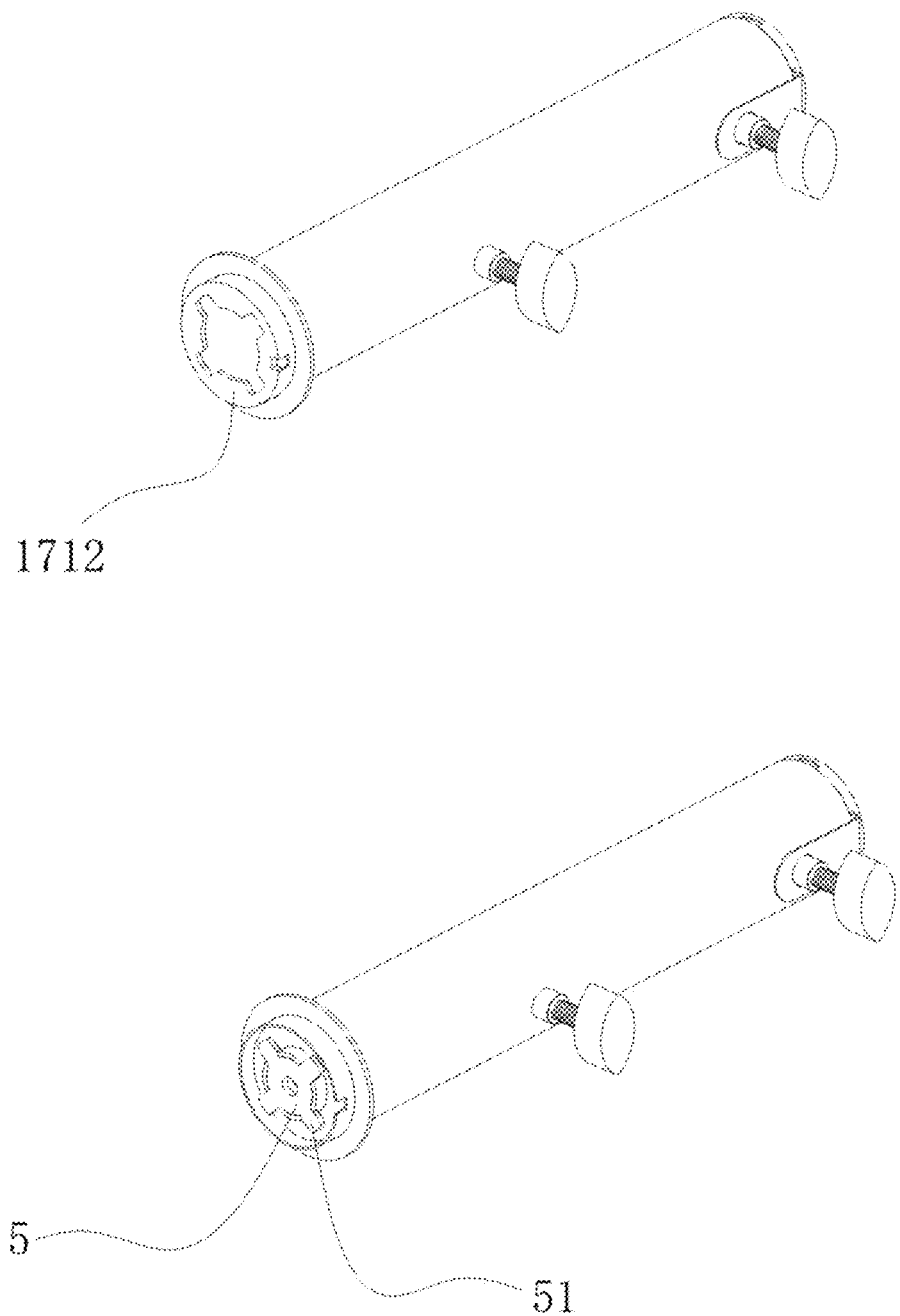
FIG. 11 is a schematic structural diagram of a bottom of a center pole according to different embodiments of the present disclosure.
Figure 12:
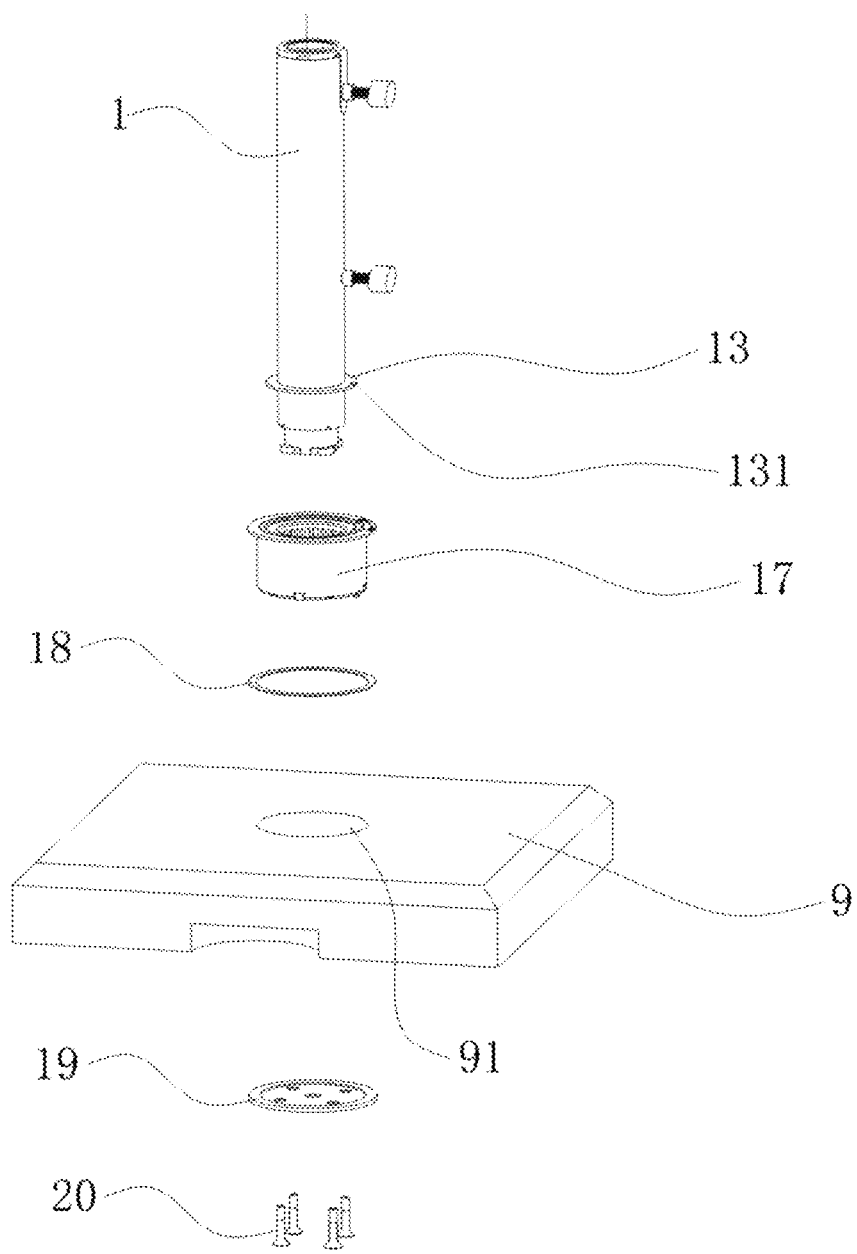
FIG. 12 is an exploded view according to an embodiment of the present disclosure.

As shown in FIG. 1 or FIG. 11, a boss having a diameter smaller than an inner diameter of the center pole 1 is disposed in the center hole 91 of the base. The anti-disengagement toothed ring 5, when fixed on the boss by a plurality of screws, forms a clamping slot 15 (as shown in FIG. 2) for engaging with the anti-disengagement locking tab 1712 (the anti-disengagement locking tab 1712 may be provided in various manner in different embodiments, as shown in FIGS. 5 and 11). The anti-disengagement toothed ring 5 may also be integrally formed with the base. The boss, the anti-disengagement toothed ring 5 and the base may be detachable from each other or integrally formed with each other. When the boss, the anti-disengagement toothed ring and the base are detachable from each other, the boss, the anti-disengagement toothed ring and the base are fixed with each other by screw locking or welding.

Figure 3:
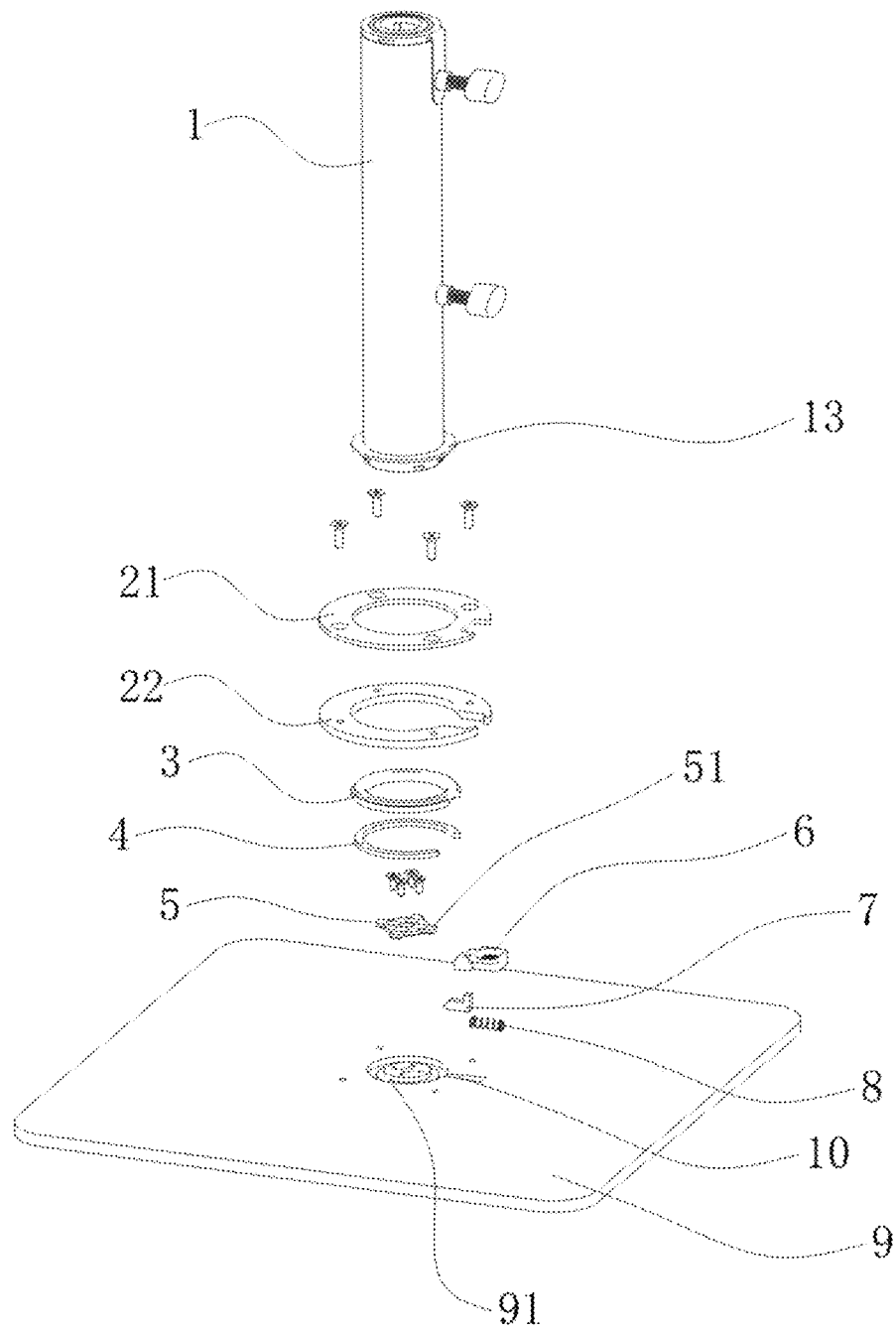
FIG. 3 is an exploded view of an overall structure according to another embodiment of the present disclosure.

A maximum diameter of the anti-disengagement toothed ring 5 is smaller than an inner diameter of the steel tube body of the center pole 1. The anti-disengagement toothed ring 5 is provided with one or more anti-disengagement catches 51 that cooperate with corresponding structures at the bottom of the steel tube body to act as the anti-disengagement function of a steel tube. The quantity of the anti-disengagement catches 51 is four as shown in FIG. 3, which may be adjusted according to the actual needs. The shape of the anti-disengagement catches 51 is not limited to that shown in the figures, as long as the anti-disengagement catches 51 may be cooperated and fixed with the base by relative rotation.

An anti-disengagement locking tab 1712 is disposed at an end of the center pole 1 inserted into the center hole 91, is arranged in an end surface or an inner cavity at a lower end of the steel tube body by welding or other forming processes, and has a hollow center, and an inner side edge is provided with at least one anti-disengagement toothed plate that cooperates with the anti-disengagement toothed ring 5 on the base to act as an anti-disengagement function for the steel tube. The anti-disengagement toothed ring 5 is cooperatively connected to the anti-disengagement locking tab 1712 to fix the center pole 1 to the base 9. When the center pole 1 is in a locking state, the anti-disengagement locking tab 1712 is located under the anti-disengagement toothed ring 5. The anti-disengagement locking tab 1712 and the anti-disengagement toothed ring constrain each other to prevent the center pole 1 from disengagement in the locking state as shown in (a) of FIG. 24.

A pin hole 131 is formed in an end of the center pole 1 connected to the base 9. The pin hole 131 may be formed in a tube wall of the center pole 1 or on an accessory surrounding the outside of the center pole 1. The base 9 is provided with a sliding slot 10. A transversely-inserted anti-rotation bolt pin 7 is disposed in the sliding slot 10 and cooperates with the pin hole 131 to play the role of preventing the center pole 1 from rotation. When the center pole 1 is connected to the base 9, the anti-rotation bolt pin 7 is clamped through the pin hole 131 as shown in (a) of FIG. 2, thereby restraining the rotation of the center pole 1 and preventing the center pole 1 from being disengaged from the base 9 due to rotation or turning. When the anti-rotation bolt pin 7 enters the pin hole 131, the center pole 1 is locked against rotation, and the center pole 1 is in a locking state with the base 9 at the moment. When the anti-rotation bolt pin 7 is withdrawn from the pin hole 131, as shown in (b) of FIG. 2, the center pole 1 may be rotated and is in an unlocking state at the moment. Preferably, a front end of the anti-rotation bolt pin 7 is provided with a rounded corner.

An anti-rotation block 6 is disposed in the sliding slot 10 in the base, is used in cooperation with the anti-rotation bolt pin 7 and a compression spring 8, and is used for controlling the anti-rotation bolt pin 7. The anti-rotation bolt pin 7 may be toggled by the anti-rotation block 6 to lock or unlock the center pole 1, so that the anti-rotation block 6 may be a separate operation element cooperating with the anti-rotation bolt pin 7, or may be formed by an extension section integrally formed or fixedly connected with the anti-rotation bolt pin 7 to prevent rotation of the steel tube body. The compression spring 8 keeps the anti-rotation bolt pin 7 to be always inserted in the pin hole 131 of the steel tube body.

A flange ring 13 is disposed at an outer side of one end of the center pole 1 connected to the base 9, and an outer circumference of the flange ring cooperates with an inner hole of the first flange 21 to plays the roles of centering and wobbling stop. An end surface of the flange ring 13 cooperates with an end surface of a support ring 3 to play the role of stopping wobbling. The flange ring 13 also plays the role of reducing the requirement on the accuracy of the dimension of the outer diameter of the center pole 1. The center pole 1 may still has a stable and firm cooperation with the base 9 by means of the flange ring 13 when the dimension of the outer diameter is not uniform sufficiently.

The first flange 21 is locked and fixed in the center hole in the base by a plurality of screws, and an inner circumference of the first flange 21 cooperates with the outer circumference of the flange ring 13 of the center pole 1 to alleviate the wobbling of the steel tube.

A support ring 3 and a compensatory backing ring 4 are disposed under the first flange 21. The support ring 3 is disposed on the compensatory backing ring 4 and is in contact with a lower end surface of the flange ring 13 of the center pole 1. If there is no support ring 3 and the compensatory backing ring 4 is in direct contact with the flange ring 13 of the center pole 1, the center pole 1 suffers from a relatively high resistance when in rotation. The support ring 3 is added to avoid that the flange ring 13 of the center pole 1 is in direct contact with the compensatory backing ring 4. The compensatory backing ring 4 has certain elasticity, such that the lower end surface of the flange ring 13 of the steel tube body is more closely fitted to the support ring 3.

Figure 9:
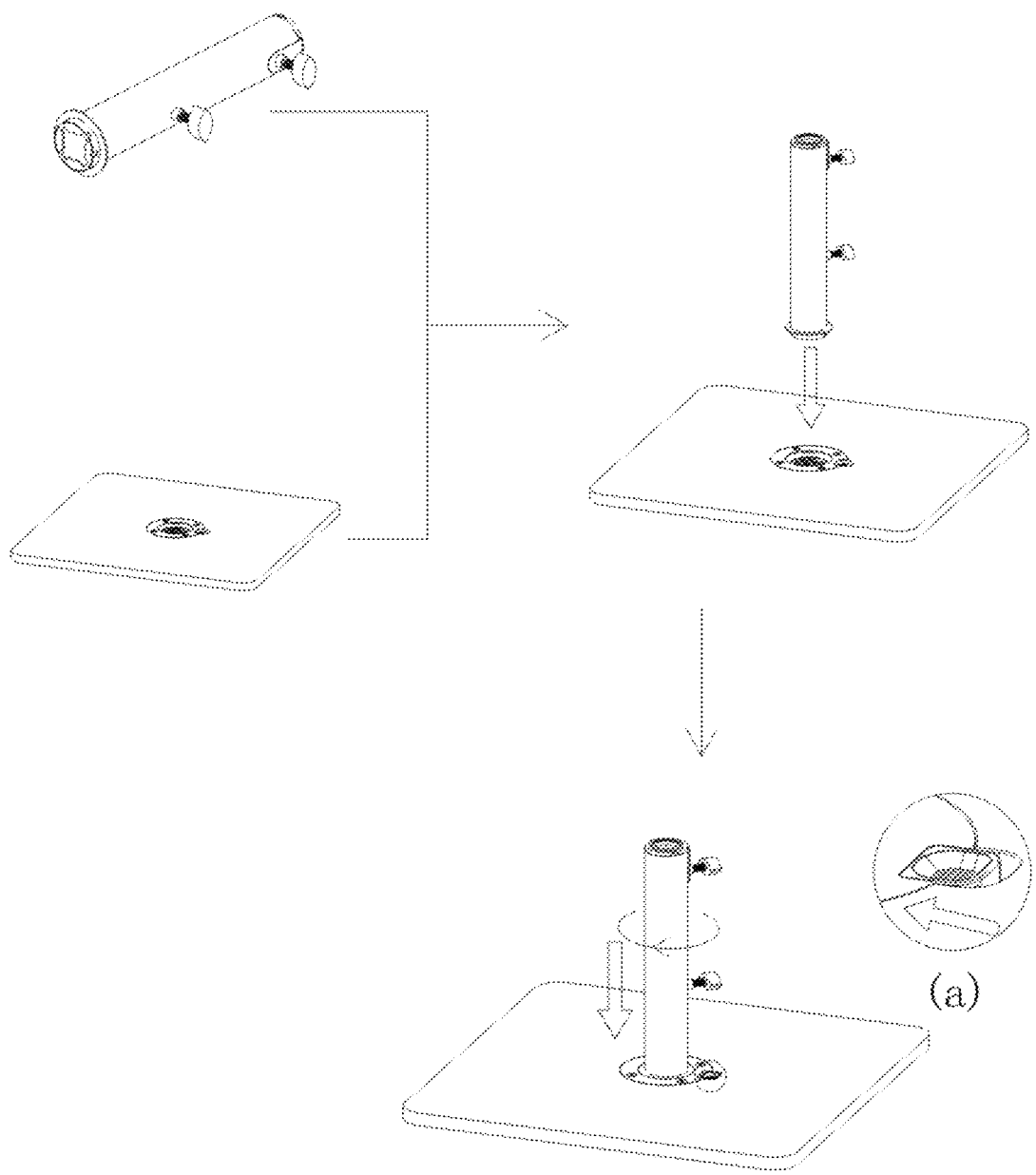
FIG. 9 is a schematic diagram of mounting a center pole to a base according to an embodiment of the present disclosure.

As shown in FIG. 9, the center pole 1 is inserted into the center hole 91 in the base 9 by aligning slots of the anti-disengagement toothed ring 5 and the anti-disengagement locking tab 1712 during mounting. The center pole 1 is pressed down such that the anti-disengagement locking tab 1712 is completely disposed under the anti-disengagement toothed ring 5 of the base. In the meantime, since the front end of the anti-rotation bolt pin 7 is provided with the rounded corner, the center pole 1 extrudes the anti-rotation bolt pin 7 as shown in (a) of FIG. 9 while being pressed down, such that the anti-rotation bolt pin 7 is completely withdrawn from the sliding slot in the base. The center pole 1 is then rotated until the anti-rotation bolt pin 7 pops out and is clamped into the pin hole 131 in the center pole 1, that is, the tube mounting operation is completed. At this time, the anti-disengagement toothed ring 5 and the anti-disengagement locking tab 1712 are clamped together, so that the center pole 1 may neither rotate nor disengage from the base 9. The above operation process may be performed with only one hand, saving time and labor.

Figure 10:
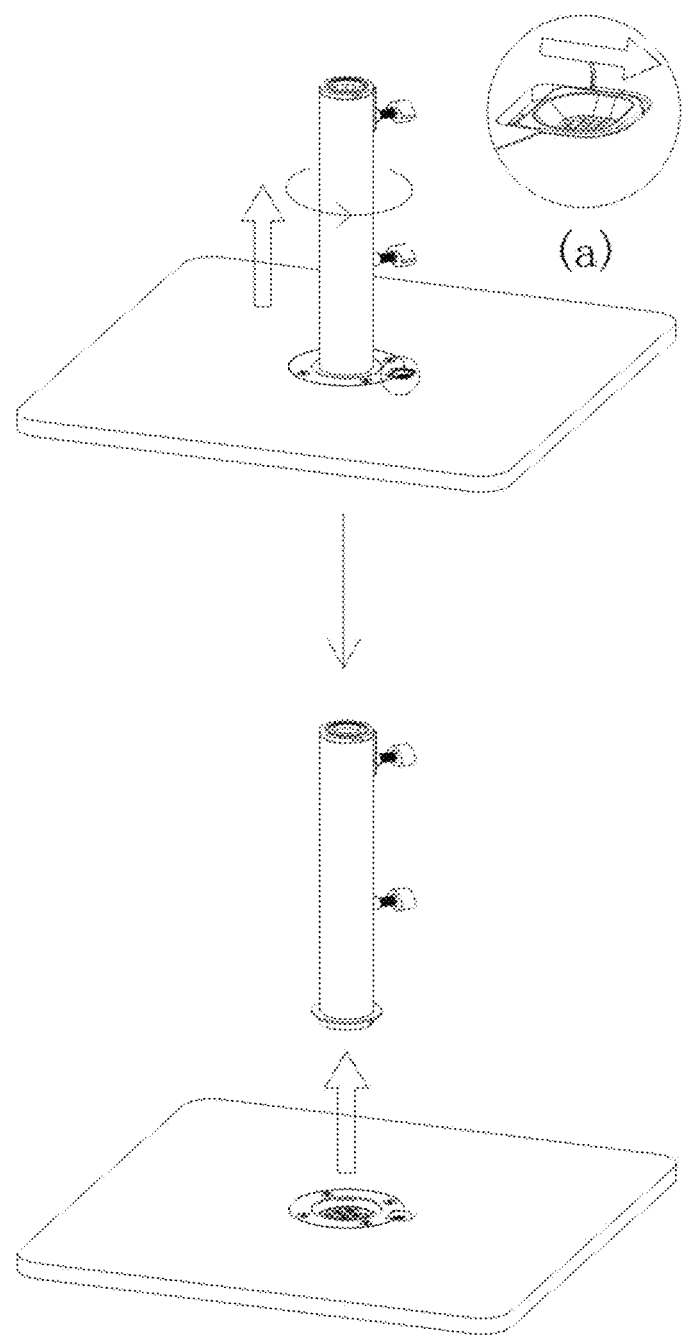
FIG. 10 is a schematic diagram showing the dismounting of FIG. 9.

As shown in FIG. 10, when the center pole 1 needs to be dismounted, the anti-rotation block 6 is toggled outwards as shown in (a) of FIG. 10, and the anti-rotation bolt pin 7 is withdrawn from the pin hole 131 at this time. Then, the center pole 1 is rotated reversely, so that the anti-disengagement toothed ring 5 and the anti-disengagement locking tab 1712 are in an unlocking state as shown in (b) of FIG. 3, and the center pole 1 is removed, thereby completing the tube dismounting operation.

Figure 4:
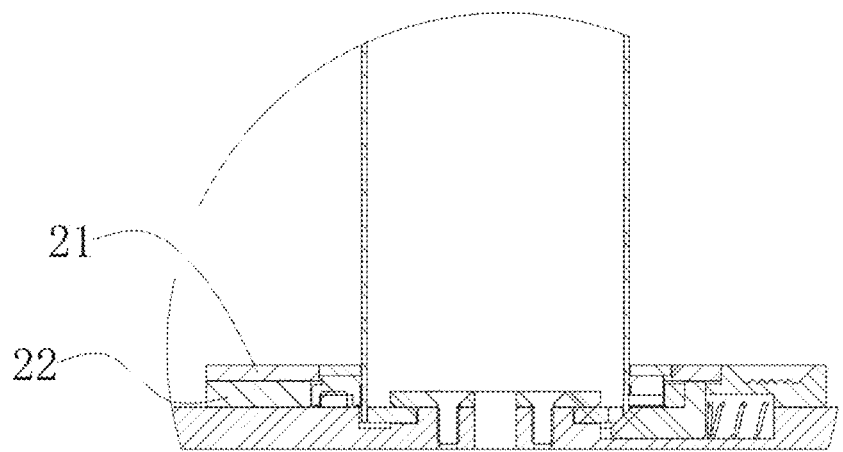
FIG. 4 is a partial section view showing the dismounting of a center pole according to another embodiment of the present disclosure.
Figure 4:
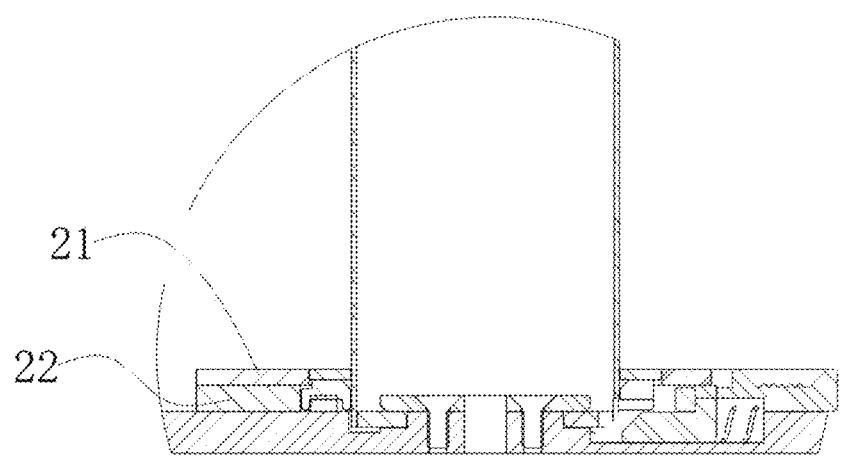

In some embodiments, as shown in FIGS. 3 and 4, when the base 9 is thinner, a second flange 22 may be added in the center hole 91 to ensure a sufficient support height such that the center pole 1 is more stable after being fixed. It will be appreciated that, based on the same purpose, thickness of the flange may be increased, or more flanges may be added, in order to obtain a sufficient support height. More specifically, the second flange 22 is located under the first flange 21 and has the same diameter as the first flange 21. At this time, the locking state and the unlocking state of the center pole 1 and the base 9 are as shown in (a) to (b) of FIGS. 8, respectively.

Figure 7:
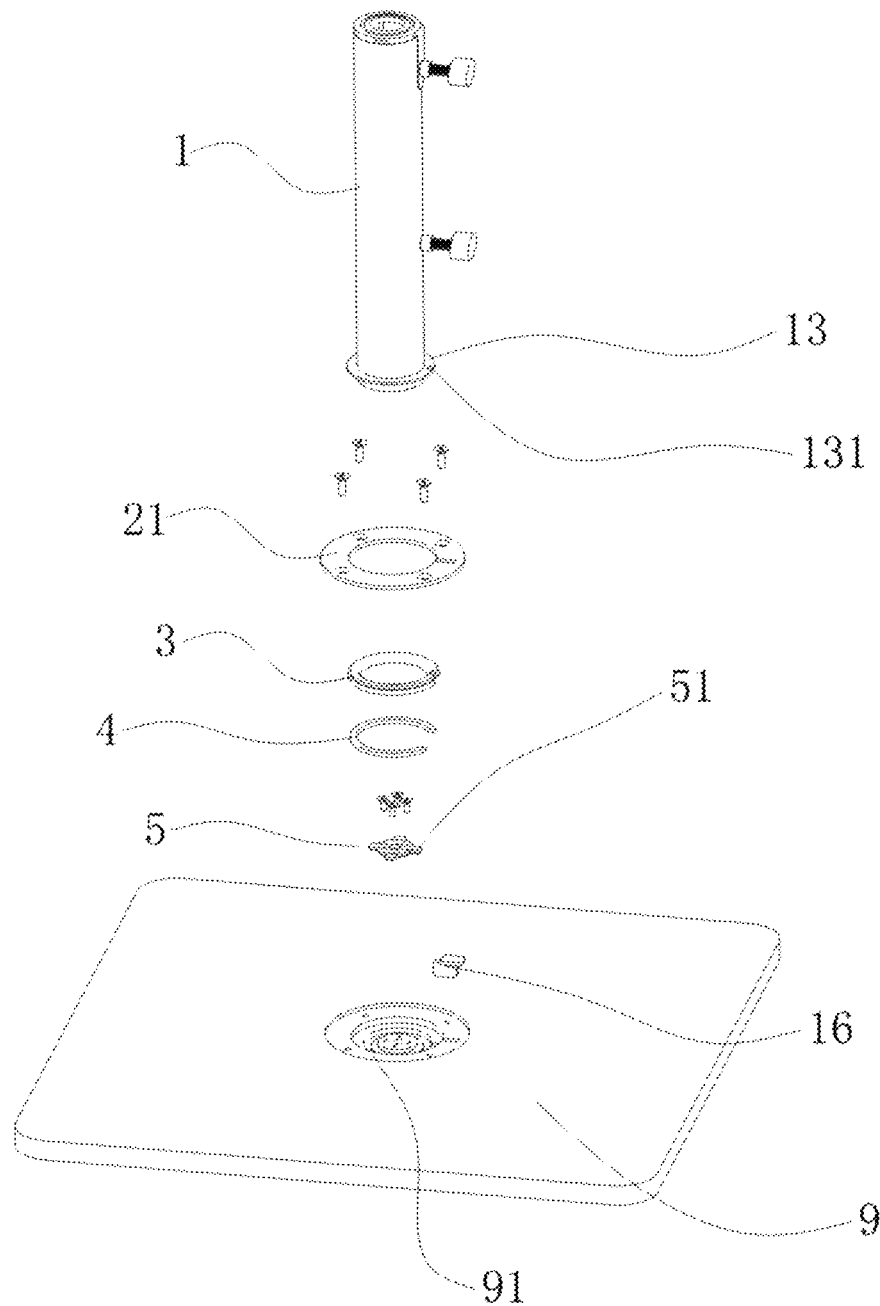
FIG. 7 is an exploded view of an overall structure according to still another embodiment of the present disclosure.
Figure 8:
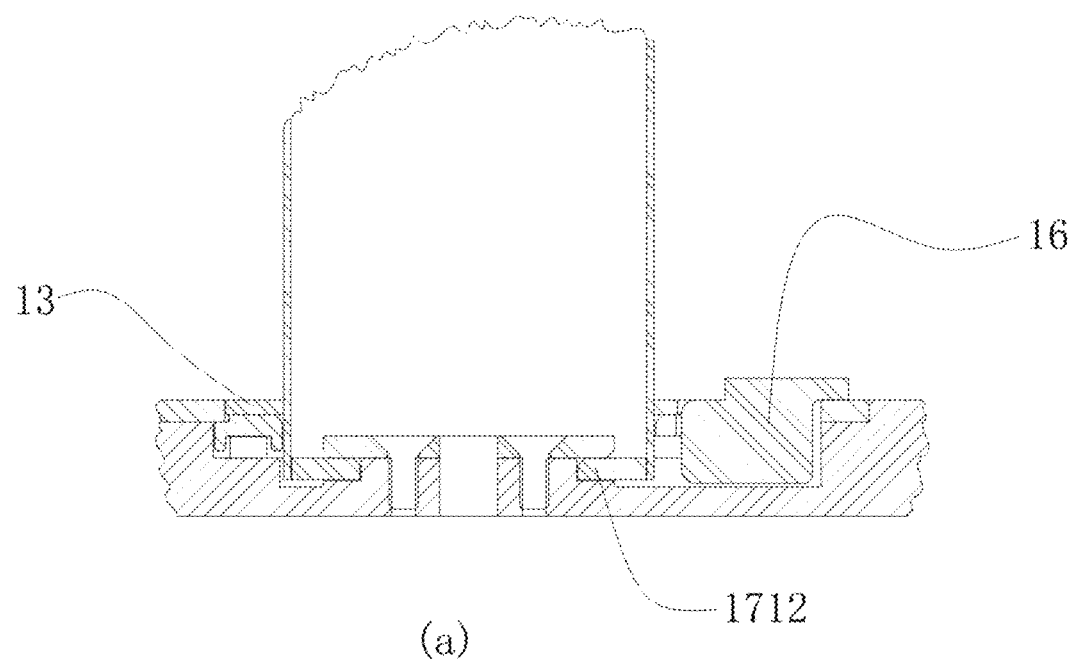
FIG. 8 is a partial section view showing the dismounting of a center pole according to still another embodiment of the present disclosure.
Figure 8:
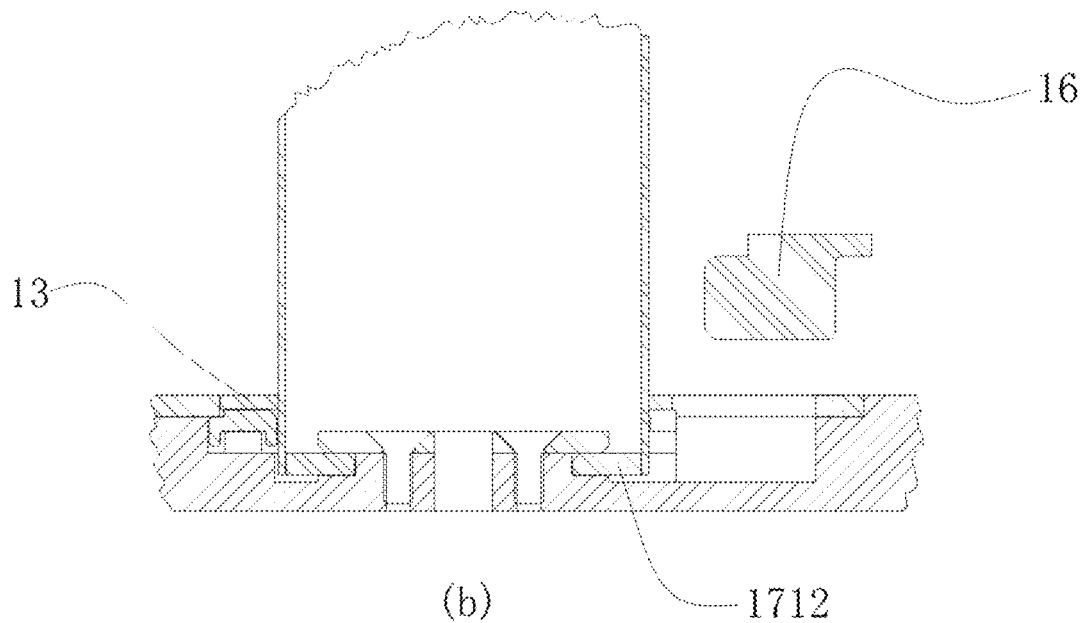

In some embodiments, as shown in FIGS. 7 and 8, the anti-rotation bolt pin 7 is in a form of a detachable movable locking pin 16 that cooperates with a pin hole 131 in the center pole 1 to limit the center pole 1. The detachable movable locking pin 16 is removed so that the center pole 1 can be rotated relative to the base 9. The pin hole 131 may be formed in the flange ring 13 of the center pole 1 or in the steel tube at a tail end of the center pole 1. A detachable movable locking pin 16 may be placed in the sliding slot 10 in the base.

Figure 6:
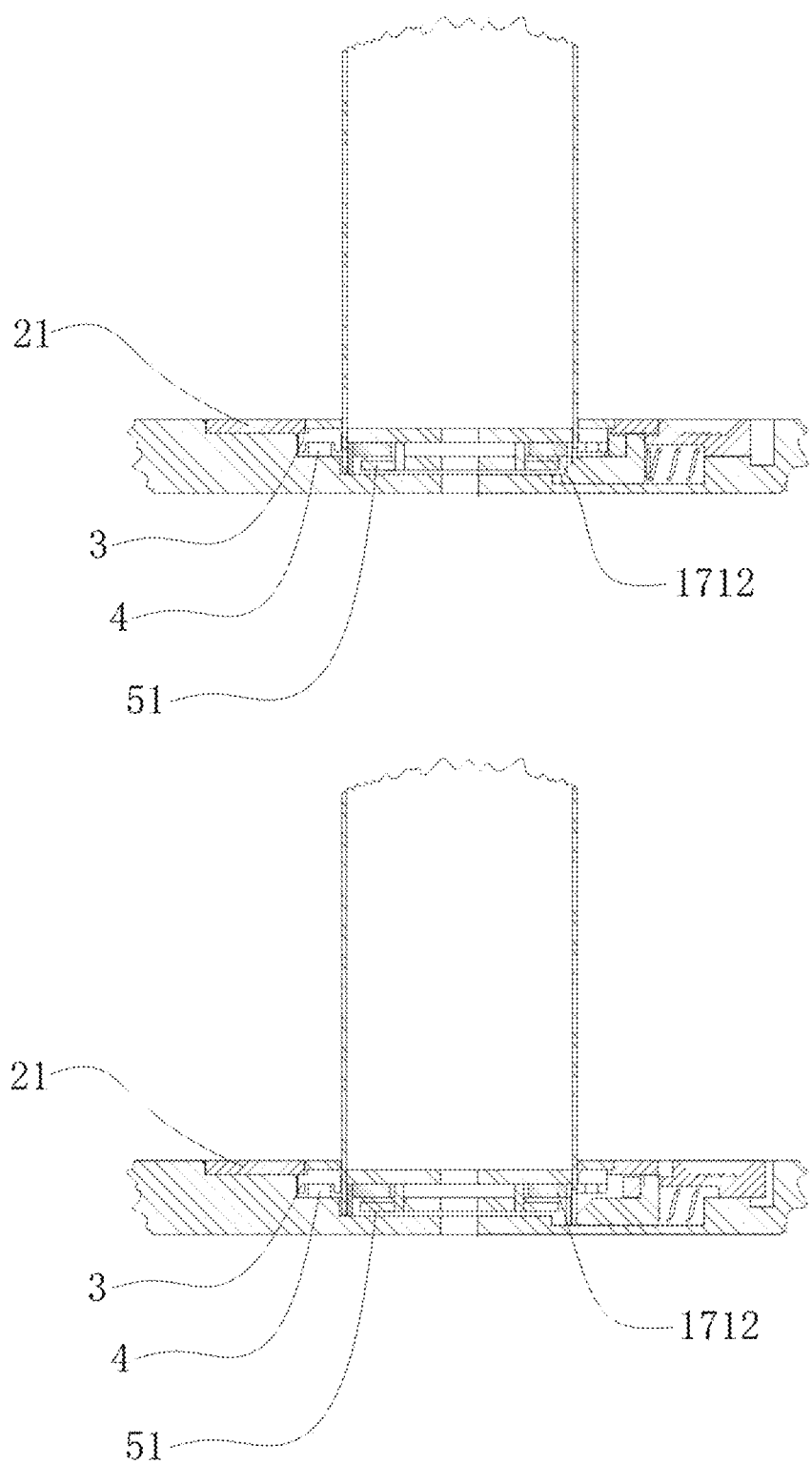
FIG. 6 is a partial section view showing the dismounting of a center pole according to yet another embodiment of the present disclosure.

In some embodiments, as shown in FIGS. 5 and 6, the anti-disengagement toothed ring is interchanged with the anti-disengagement locking tab 1712 in positions. That is, the anti-disengagement toothed ring 5 is disposed at one end of the center pole 1 inserted into the center hole 91, and the anti-disengagement locking tab 1712 is fixed at the center hole 91 in the base 9. The anti-disengagement toothed ring 5 is placed in the inner cavity at the lower end of the center pole 1 by welding or other forming processes, and the inner side edge is provided with one or more anti-disengagement toothed plates, which structurally cooperate with the anti-disengagement locking tab 1712 on the base to act as an anti-disengagement function of the steel tube.

The stopper matched is disposed between the contact surfaces of the anti-disengagement fixing structure, which reduces the requirement on the accuracy for the machining of the anti-disengagement fixing structure. For example, an edge of the anti-disengagement catch 51 or the anti-disengagement locking tab 1712 is a wedge portion. Alternatively, a surface of the anti-disengagement locking tab 1712 in contact with the anti-disengagement toothed ring 5 is provided with a bump or a ridge (not shown in the figures). The wedge portion or the bump may be disposed on the anti-disengagement locking tab 1712 or on the anti-disengagement toothed ring. When the anti-disengagement catch 51 and the anti-disengagement locking tab 1712 are locked together, a gap is present between the contact surfaces of the anti-disengagement catch 51 and the anti-disengagement locking tab 1712 to cause untight clamping, resulting in wobbling of the center pole 1. The gap between the contact surfaces becomes smaller as the center pole 1 is rotated by the design of the wedge portion or the bump, thereby further improving the stability of the center pole 1.

In some embodiments, as shown in FIGS. 12-24, the end of the center pole 1 inserted into the center hole 91 is provided with the anti-disengagement toothed ring 5. A mounting block 17 is disposed in the center hole 91. The mounting block 17 includes a sleeve 171, and a bottom plate 1710 is welded on the sleeve 171, may be detachably connected, or may be integrally formed with the sleeve 171. The bottom plate 1710 is provided with the anti-disengagement locking tab 1712 that is cooperatively connected to the anti-disengagement toothed ring 5 to fix the center pole 1 to the base 9. A locking pin is disposed in the mounting block 17, and the flange ring 13 is fixed on the outside the tube body of the center pole 1, and is provided with a pin hole 131. The locking pin is clamped through the pin hole 131 when the center pole 1 is connected to the base 9, thereby constraining the rotation of the center pole 1 and preventing the center pole 1 from disengagement from the base 9 due to rotation or turning.

The locking pin is an elastic locking pin 173 or a press type locking pin or a telescopic elastic locking pin or a detachable movable locking pin 16.

The bottom plate 1710 of the mounting block 17 is provided with a threaded hole 1711 and a positioning notch 1713. The threaded hole 1711 is used to tighten and fix the mounting block 17 in the center hole 91 in the base 9 by the cooperation of a locking disc 19 and screws 20. One end of the elastic locking pin 173 passes through the positioning notch 1713 and is pivotally connected to the bottom plate 1710.

Figure 13:
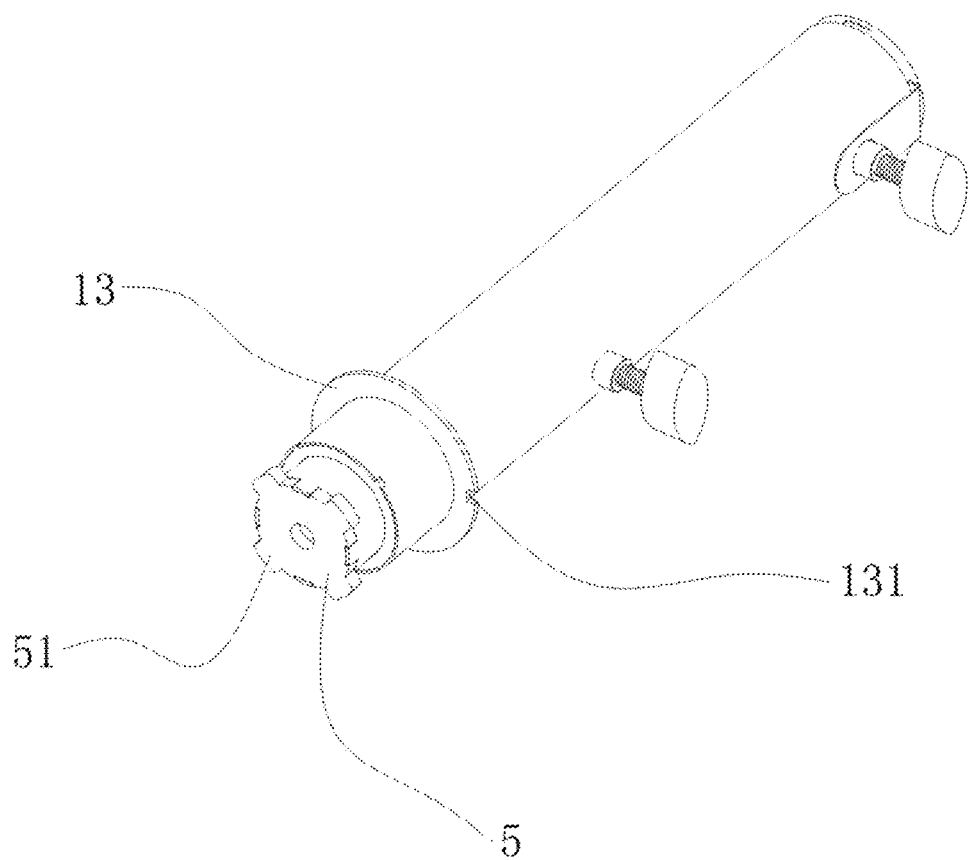
FIG. 13 is a structural diagram of a center pole according to an embodiment of the present disclosure.
Figure 14:
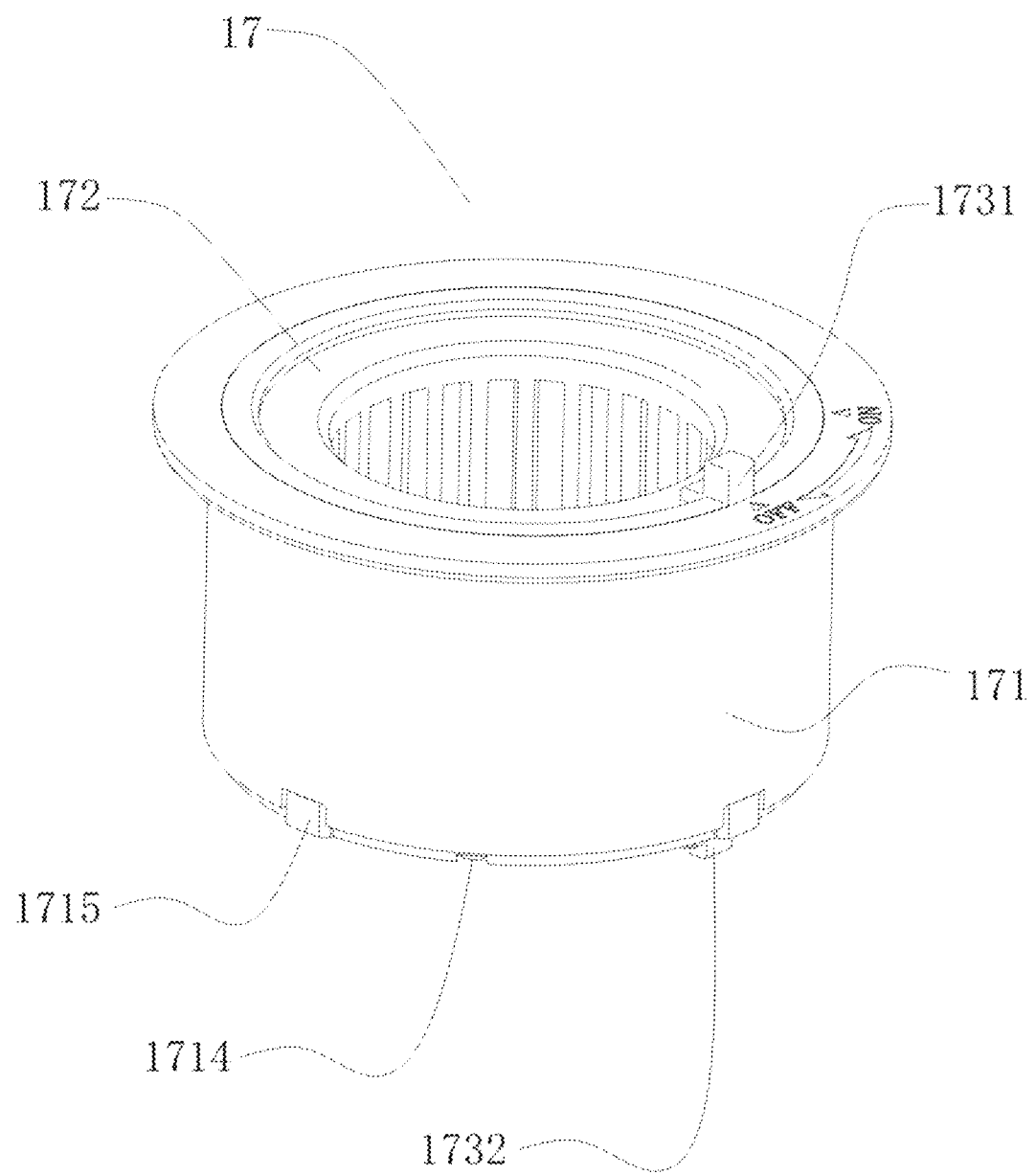
FIG. 14 is a schematic structural diagram of a mounting block according to an embodiment of the present disclosure.
Figure 15:
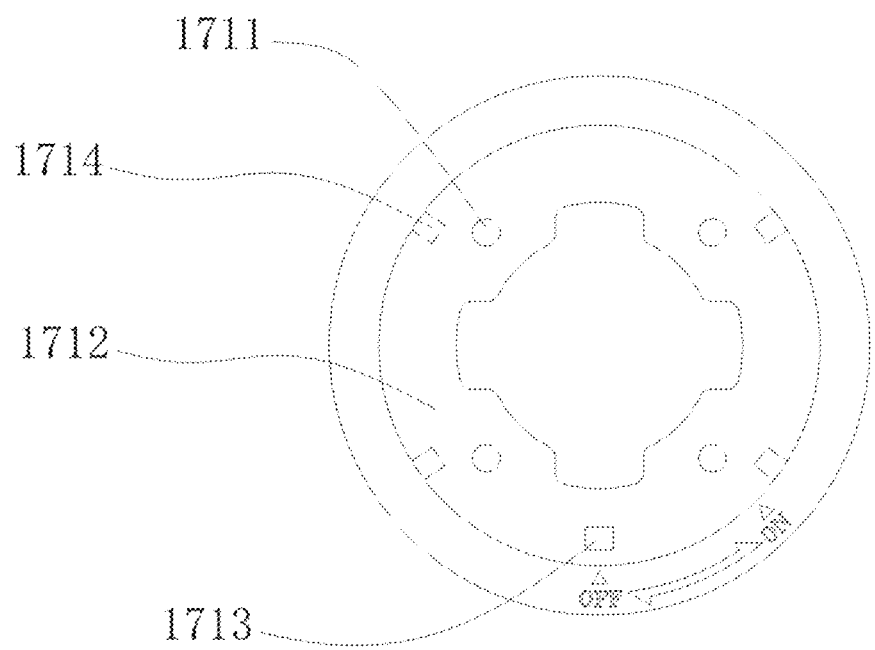
FIG. 15 shows a top view and a section view of an embodiment of FIG. 14.
Figure 15:
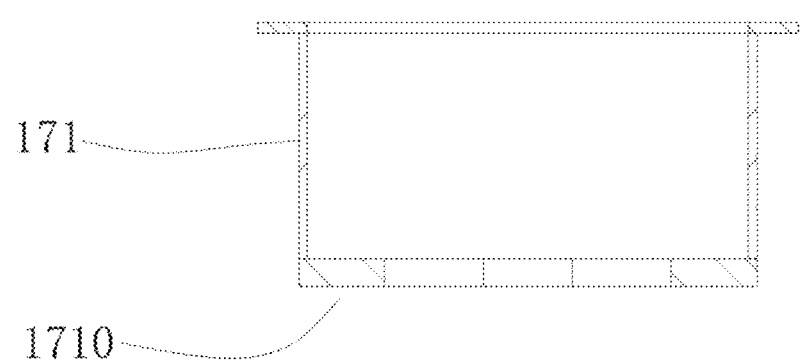
Figure 16:
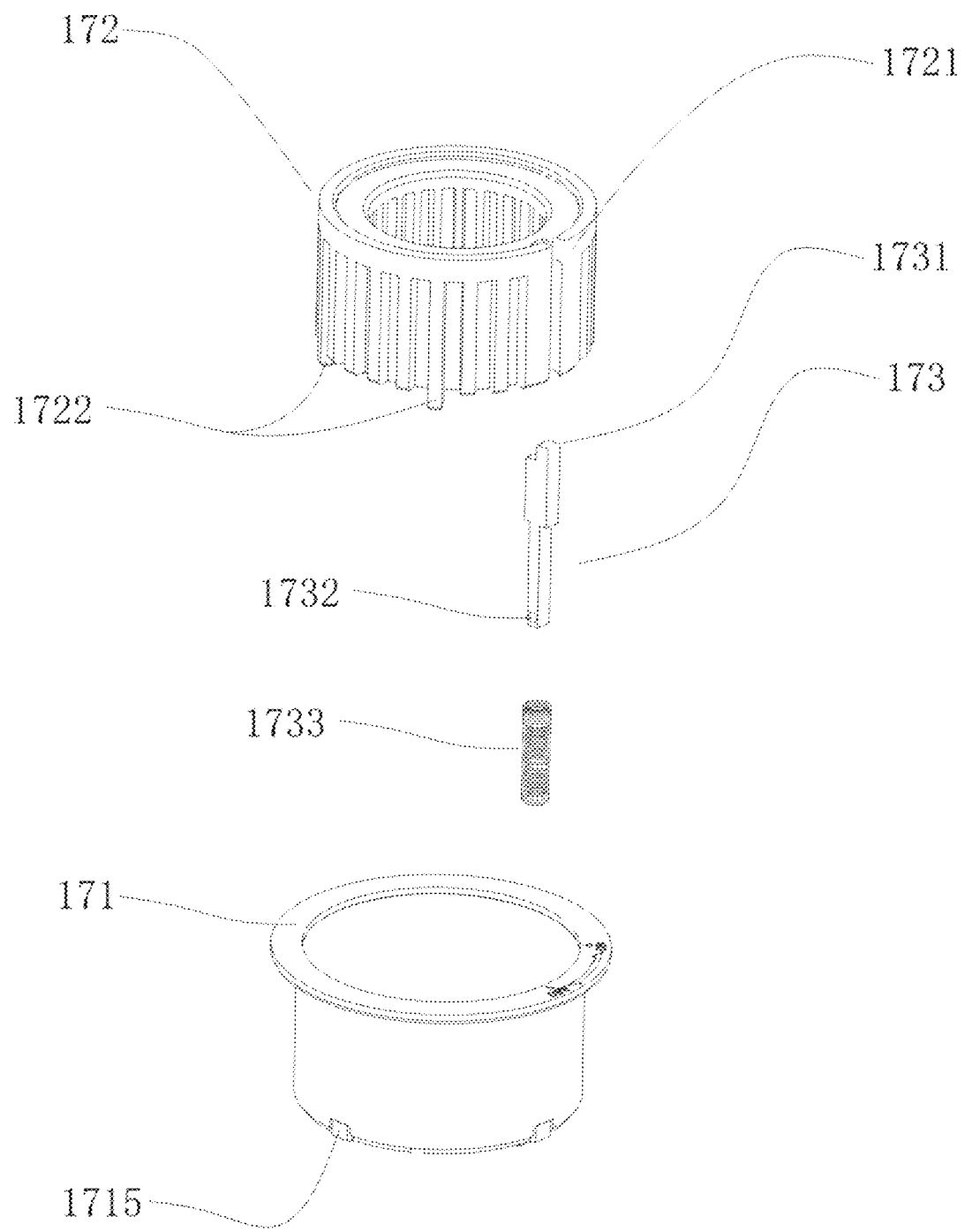
FIG. 16 is an exploded view of an embodiment of FIG. 14.

As shown in FIGS. 12-16, the base 9 is provided with the center hole 91. The center pole 1 is a steel tube, and the flange ring 13 is welded on the outer side of the lower end of the tube body of the center pole, and the flange ring 13 is provided with the pin hole 131 that cooperates with the elastic locking pin 173 to play the role of preventing rotation. The outer circumference of the flange ring 13 cooperates with the mounting block 17 to play the roles of centering and wobbling stop. A clamping slot 15 having a diameter smaller than the inner diameter of the tube body is welded in the bottom of the center pole 1. The anti-disengagement toothed ring 5 is welded on the clamping slot 15, and has the maximum diameter smaller than the inner diameter of the tube body of the center pole 1. The anti-disengagement toothed ring 5 is provided with one or more anti-disengagement catches 51 (not fully shown in the figures), which cooperate with the bottom plate 1710 of the mounting block 17 to act as an anti-disengagement function of the tube body. The quantity of the anti-disengagement catches 51 is four as shown in FIG. 13, which may be adjusted according to the actual needs. The shape of the anti-disengagement catches 51 is not limited to that shown in the figures, as long as the anti-disengagement catches 51 may be cooperated and fixed with the base by relative rotation.

The mounting block 17 includes a sleeve 171, a transition sleeve 172, and an elastic locking pin 173. The sleeve 171 is welded to the bottom plate 1710, and the bottom plate 1710 is provided with the anti-disengagement locking tab 1712 that cooperates with the anti-disengagement toothed ring 5 to prevent the center pole 1 from disengagement from the base 9. The bottom plate 1710 is additionally provided with a positioning notch 1713, a plurality of stop notches 1714 (not fully shown in the figure) and threaded holes 1711 (not fully shown in the figure). The mounting block 17 is tightened and fixed in the center hole 91 in the base 9 by the cooperation of the locking disc 19, the screws 20 and the threaded holes 1711 in the bottom plate 1710. A spring 1733 is mounted at a lower end of the elastic locking pin 173, such that the elastic locking pin 173 always pops up.

The transition sleeve 172 is embedded in the mounting block 17, such that the tube body of the center pole 1 has good centering and wobbling stop effects. The transition sleeve 172 includes a stop buckle 1722. The stop buckle 1722 is inserted into a stop notch 1714 in the bottom plate 1710 to prevent rotation of the transition sleeve 172. The transition sleeve 172 is also provided with a stopper mounting slot 1721 that allows the elastic locking pin 173 to pass through the transition sleeve 17 to be fixed on the bottom plate 1710. The same base 9 may satisfy center holes 1 having different outer diameters by replacing transition sleeves 172 having different inner diameters.

The lower end of the elastic locking pin 173 is provided with a through hole 1732 such that the elastic locking pin protrudes out from the positioning notch 1713 in the bottom plate 1710 and is fixed by a transverse bolt pin. The upper end of the elastic locking pin 173 is provided with a bulge 1731. The bulge 1731 cooperates with the pin hole 131 of the flange ring 13 on the outside of the center pole 1 to prevent rotation. A spring 1733 is also mounted at the lower end of the elastic locking pin 173, such that the elastic locking pin 173 always pops up.

The center pole 1 is inserted into the mounting block 17 of the center hole 91 in the base 9 by aligning slots of the anti-disengagement toothed ring 5 and the anti-disengagement locking tab 1712 during mounting. The tube body of the center pole 1 is pressed down such that the anti-disengagement toothed ring 5 is completely disposed under the bottom plate 1710 of the mounting block 17. At the same time, the flange ring 13 will also press down the elastic locking pin 173, and the tube body is rotated until the elastic locking pin 173 pops up to be clamped into the pin hole 131 of the flange ring 13. The above operation process may be performed with only one hand, saving time and labor.

Figure 24:
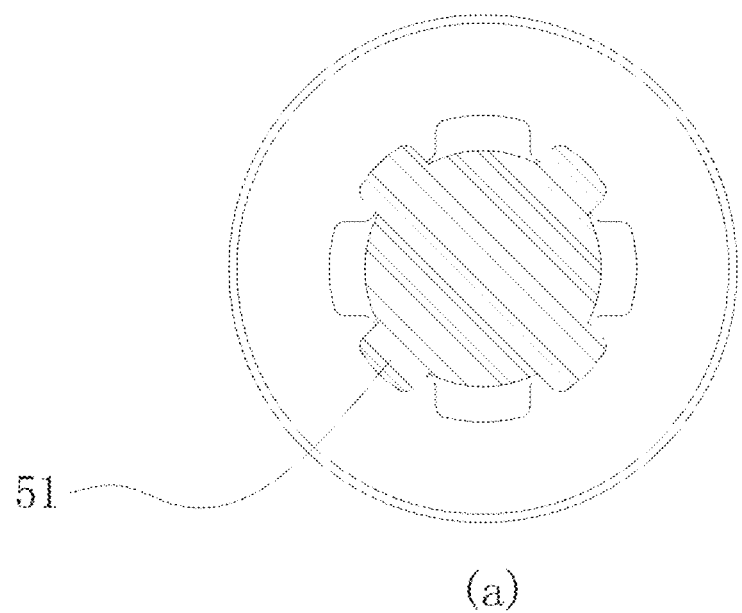
FIG. 24 is a schematic structure showing a locking state and an unlocking state of an anti-disengagement fixing structure according to the present disclosure.
Figure 24:
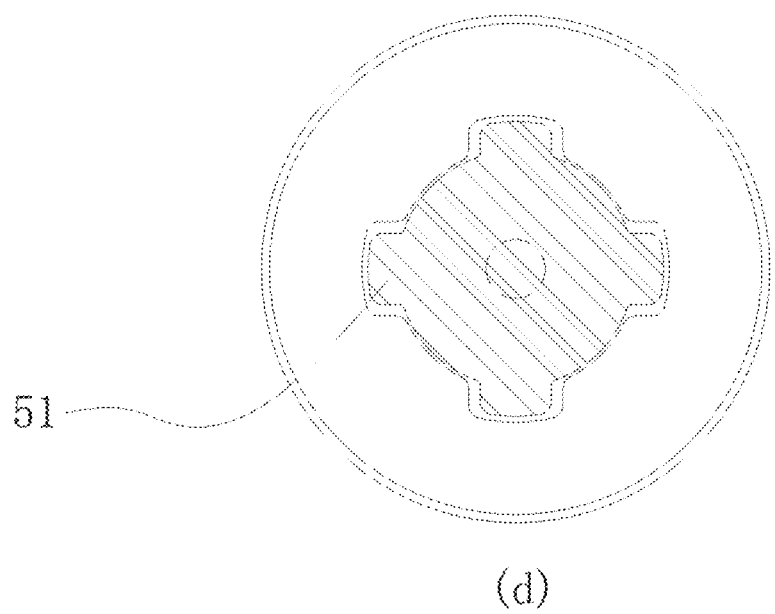

When the center pole 1 is in a fixed state, the anti-disengagement toothed ring 5 is located under the anti-disengagement locking tab 1712 for the bottom plate 1710, and the anti-disengagement toothed ring 5 and the anti-disengagement locking tab 1712 constrain each other to prevent the center pole 1 from disengagement, as shown in the locking state in (a) of FIG. 24.

When the center pole 1 needs to be disengaged, the bulge 1731 of the elastic locking pin 173 is pressed, so that the elastic locking pin 173 is withdrawn from the pin hole 131. Then, the center pole 1 may be rotated to withdraw the anti-disengagement toothed ring 5 at the lower end from the anti-disengagement locking tab 1712 for the bottom plate 1710 in an unlocking state as shown in (b) of FIG. 24. Subsequently, the center pole 1 is pulled out.

A spacer 18 is disposed between the mounting block 17 and the base 9, and is preferably made of a material capable of slight deformation. The spacer 18 is added to avoid direct contact between the mounting block 17 and the surface of the base 9 so as to prevent scratching of the surface of the outer appearance of the base 9, to reduce the relative sliding possibility of the mounting block 17 to some extent and to act as an anti-loosening effect on the other hand.

The center pole 1 and the base 9 may also be in connection and cooperation by means of a hook.

Figure 20:
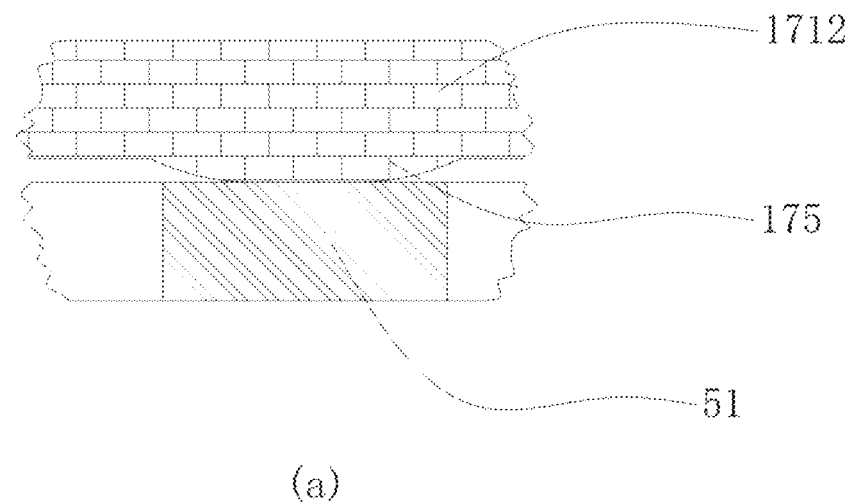
FIG. 20 is a partially enlarged view of a contact surface of an anti-disengagement fixing structure according to an embodiment of the present disclosure.
Figure 20:
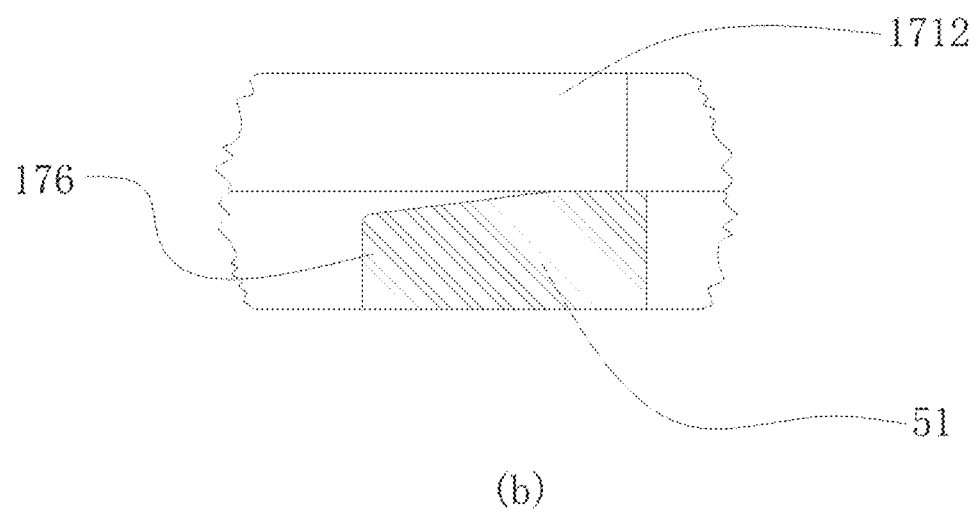

As shown in FIG. 20, the stopper matched is disposed between the contact surfaces of the anti-disengagement fixing structure, which reduces the requirement on the accuracy for the machining of the anti-disengagement fixing structure. For example, the edge of the anti-disengagement catch 51 or the anti-disengagement locking tab 1712 is a wedge portion 176. Alternatively, the surface of the anti-disengagement locking tab 1712 in contact with the anti-disengagement toothed ring 5 is provided with a bump 175 or a ridge (not shown in the figures). The wedge 176 or bump 175 may be provided on the anti-disengagement locking tab or on the anti-disengagement toothed ring. When the anti-disengagement catch 51 and the anti-disengagement locking tab 1712 are locked together, a gap is present between the contact surfaces of the anti-disengagement catch 51 and the anti-disengagement locking tab 1712 to cause untight clamping, resulting in wobbling of the center pole 1. The gap between the contact surfaces becomes smaller as the center pole 1 is rotated by the design of the wedge portion 176 or the bump 175, thereby further improving the stability of the center pole 1.

Figure 21:
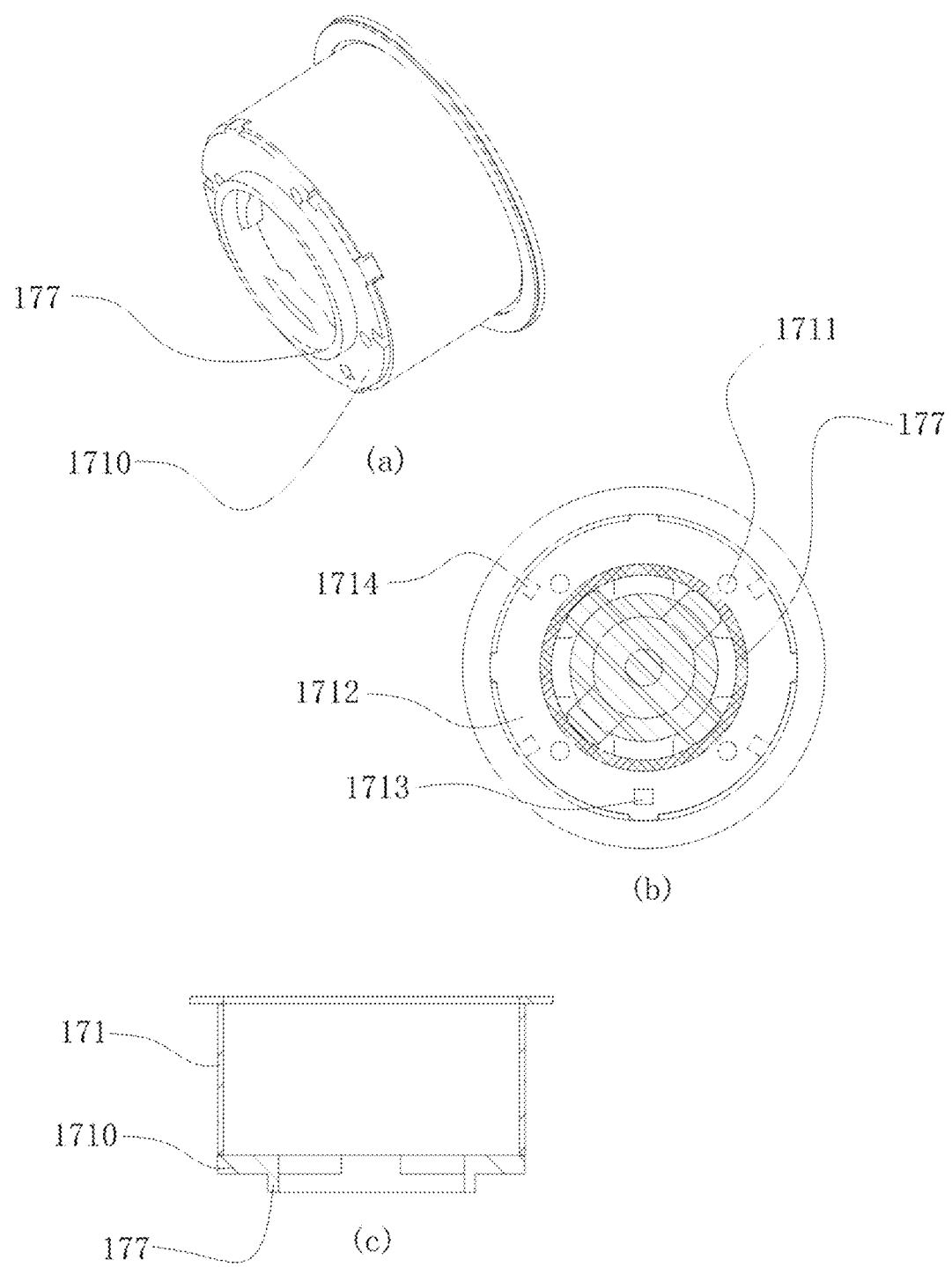
FIG. 21 is a schematic structural diagram of an anti-wobbling ring according to an embodiment.
Figure 22:
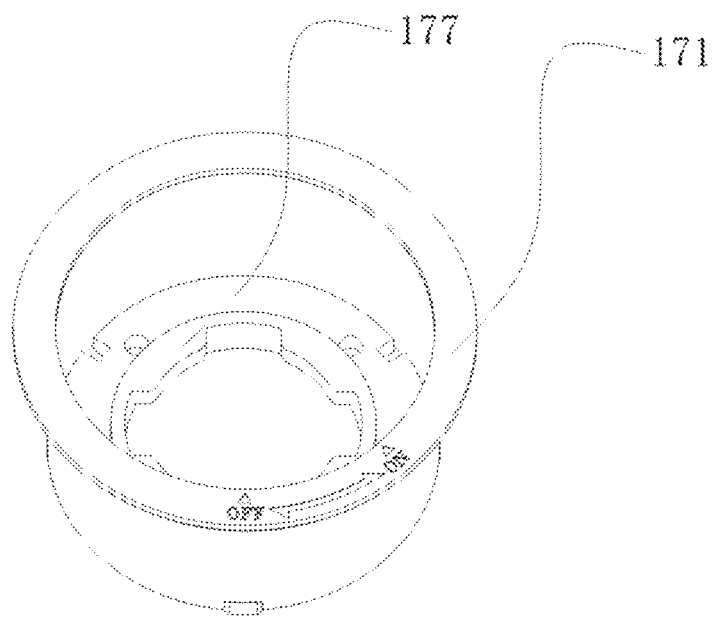
FIG. 22 is a schematic structural diagram of another anti-wobbling ring according to an embodiment.
Figure 22:
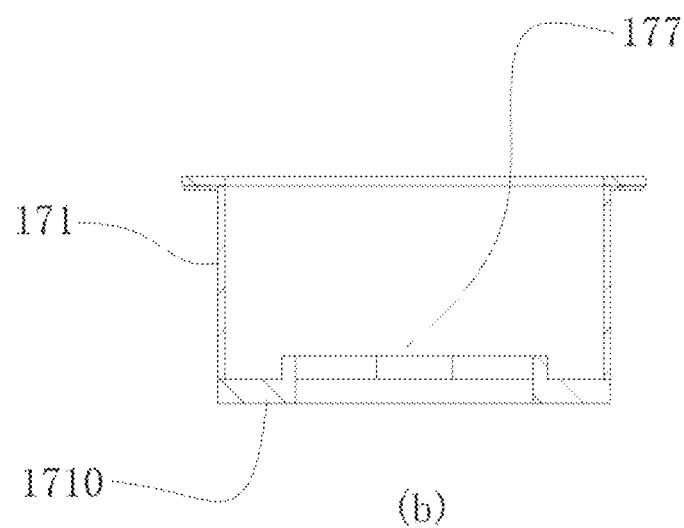

As shown in FIG. 21-FIG. 22, an anti-wobbling ring 177 is additionally disposed on the outside of the bottom plate 1710 of the mounting block 17. When the anti-disengagement toothed ring 5 enters the center hole 91 in the base 9, the outer circumference of the anti-disengagement toothed ring 5 cooperates with an inner wall of the anti-wobbling ring 177 to further improve the stability and firmness of the center pole 1 and the base 9. (b) of FIG. 21 is a top view of the mounting block, wherein a black filled part refers to the anti-disengagement toothed and the center pole 1 in the locking state at this time. The anti-wobbling ring 177 may also be disposed the inside of the bottom plate 1710, as shown in FIG. 22.

Figure 17:
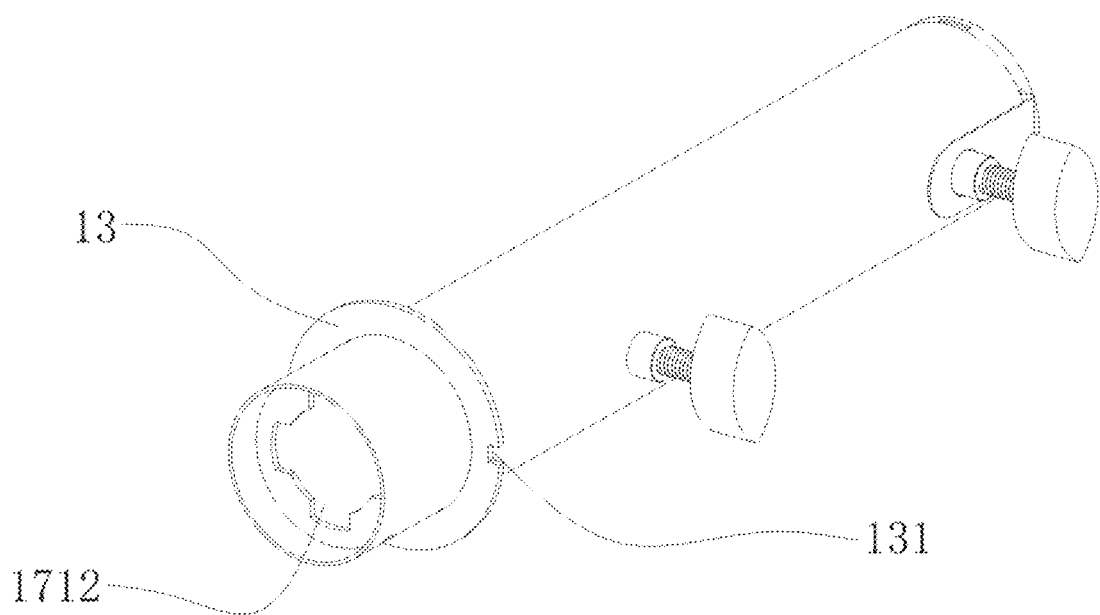
FIG. 17 is a structural diagram of a center pole according to another embodiment of the present disclosure.
Figure 18:
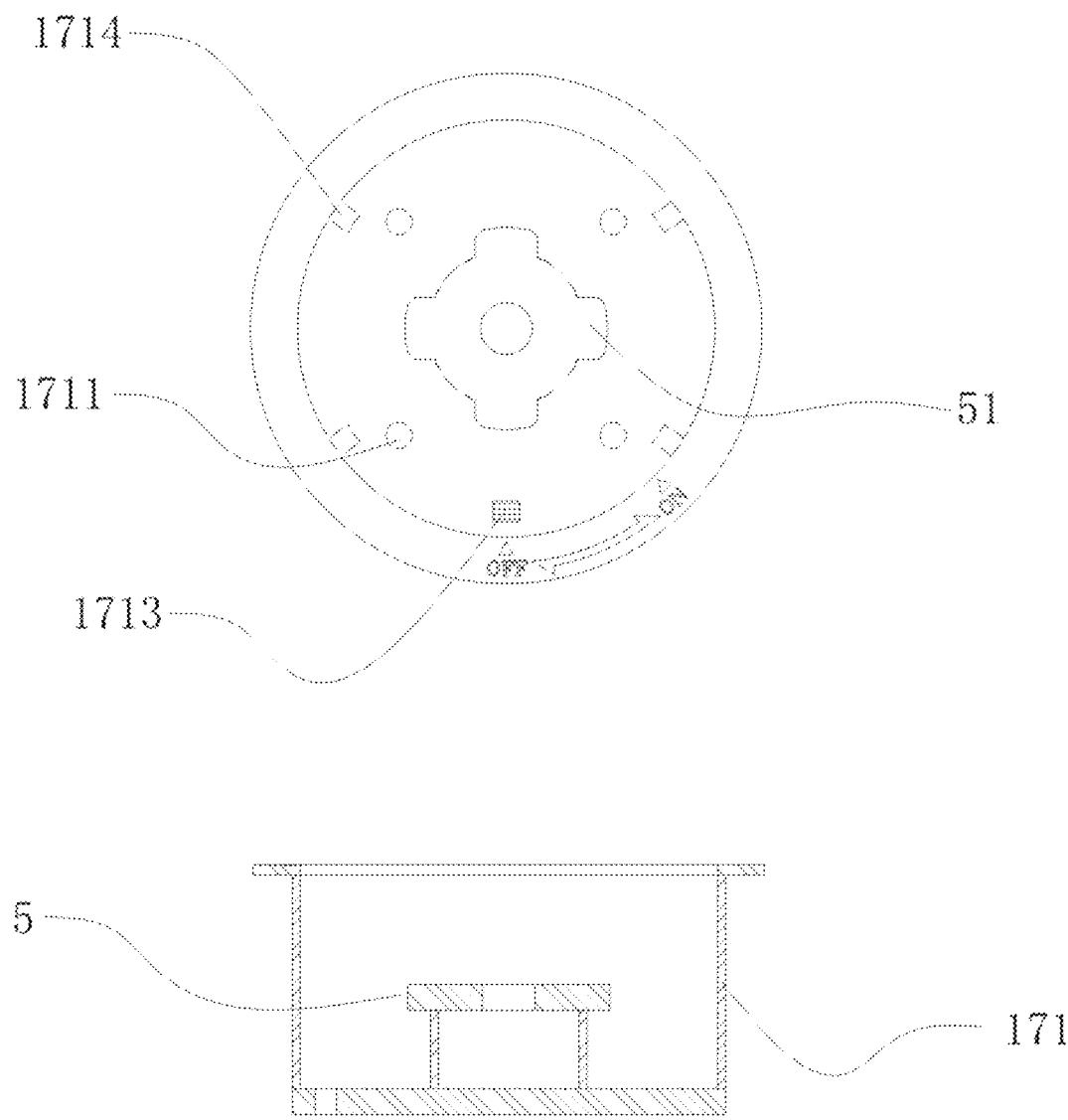
FIG. 18 shows a top view and a section view of a mounting base according to an embodiment of the present disclosure.

As shown in FIG. 17-FIG. 18, the difference from the previous embodiment is that the anti-disengagement toothed ring 5 is interchanged with the anti-disengagement locking tab 1712 in positions. At this time, the anti-disengagement toothed ring 5 is disposed at the center of the bottom plate 1710 of the mounting block 17, and is fixed to the bottom plate 1710 through the clamping slot 15. Similarly, the anti-disengagement toothed ring 5 is provided with a plurality of anti-disengagement catches 51. The anti-disengagement locking tab 1712 is welded in the inner cavity at the lower end of the tube body of the center pole 1, has a hollow center, and the inner edge is provided with one or more toothed plates, which cooperate with the anti-disengagement toothed ring 5 for the bottom plate 1710 of the mounting block 17 to act as an anti-disengagement function.

Figure 23:
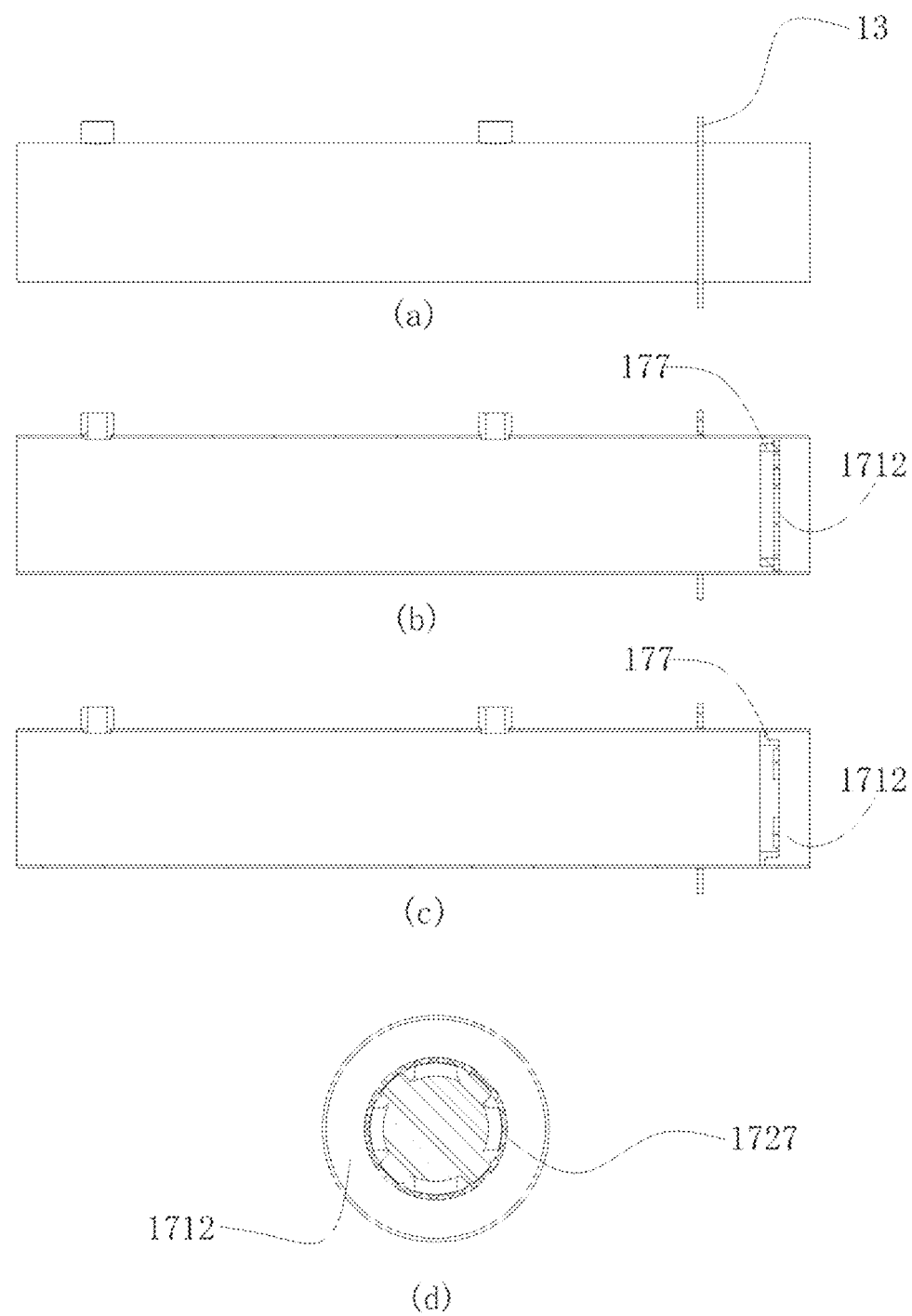
FIG. 23 is a schematic structural diagram of an anti-wobbling ring according to another embodiment.

As shown in FIG. 23, the anti-wobbling ring 177 is disposed on the inside or outside of the anti-disengagement locking tab 1712 in the center pole 1. When the center pole 1 is connected to the base 9, the outer circumference of the anti-disengagement toothed ring 5 cooperates with the inner wall of the anti-wobbling ring 177 to further improve the stability and firmness of the center pole 1 and the base 9. (d) of FIG. 23 is a top view of the mounting block, wherein a black filled portion refers to the anti-disengagement toothed ring.

Figure 19:
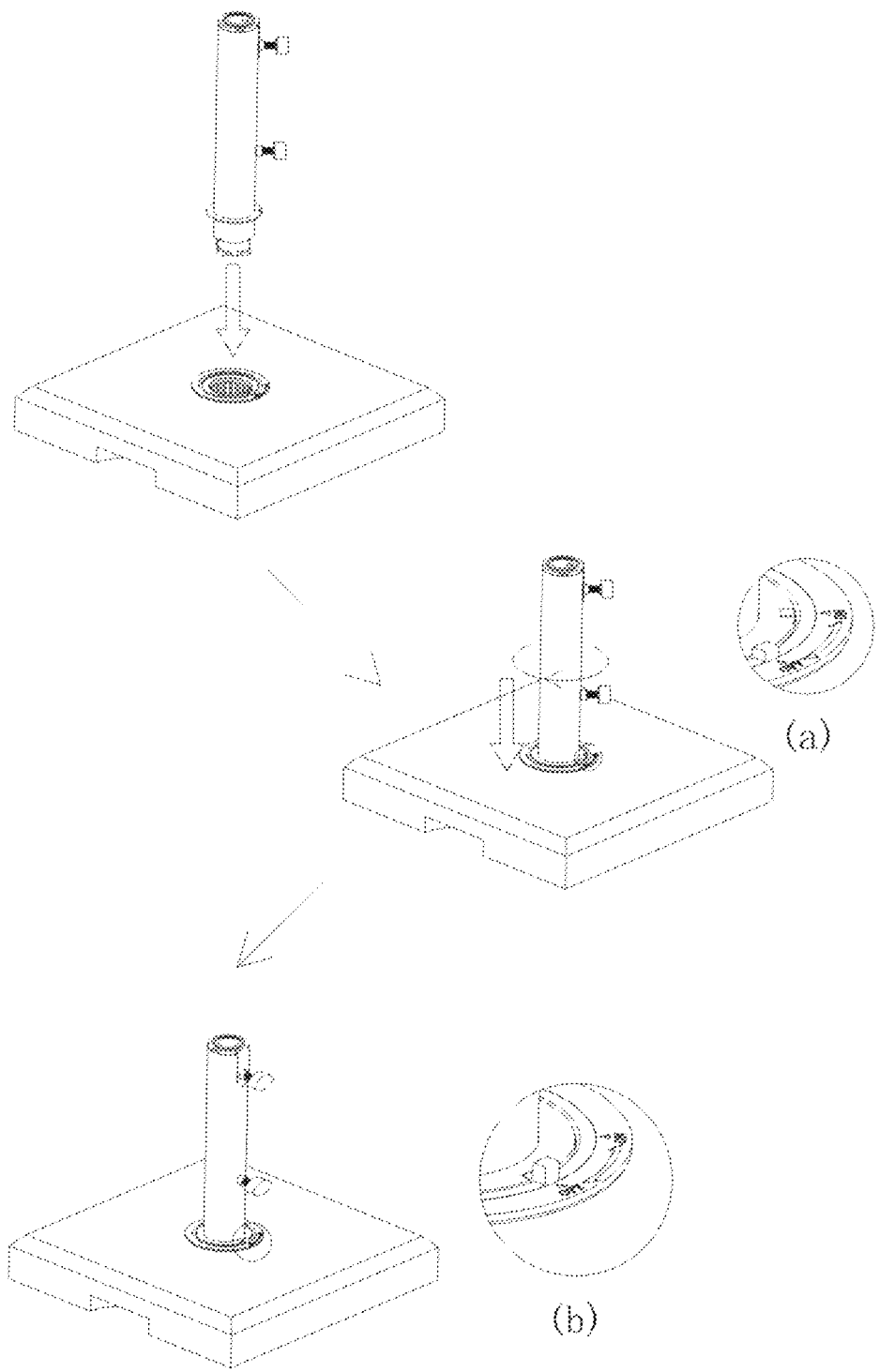
FIG. 19 is a schematic diagram showing the mounting of a center pole according to an embodiment of FIG. 12.

FIG. 19 shows a mounting process and a dismounting process of the center pole 1, wherein operation steps during mounting are the same as the operation steps described in the above embodiment. First, the anti-disengagement toothed ring 5 of the center pole 1 is aligned with the anti-disengagement locking tab 1712 on the bottom plate 1710 of the mounting block 17, and the center pole 1 is inserted into the mount 17 of the hole 91 in the base 9. The tube body of the center pole is pressed down, and at the same time, the flange ring 13 may also press down the elastic locking pin 173. The tube body of the center pole 1 is rotated until the elastic locking pin 173 pops up to be clamped into the pin hole 131 in the flange ring 13, thereby completing the tube mounting operation. At this time, the anti-disengagement toothed ring 5 and the anti-disengagement locking tab 1712 are clamped together, so that the center pole 1 may neither rotate nor disengage from the base 9.

When the center pole 1 needs to be dismounted, only the elastic locking pin 173 is pressed down to withdraw from the pin hole 131 in the flange ring 13. At this time, the tube body of the center pole 1 is reversely rotated so that the anti-disengagement toothed ring 5 and the anti-disengagement plate 1712 are in the unlocking state, and the center pole 1 is removed, thereby completing the tube dismounting operation.

Figure 25:
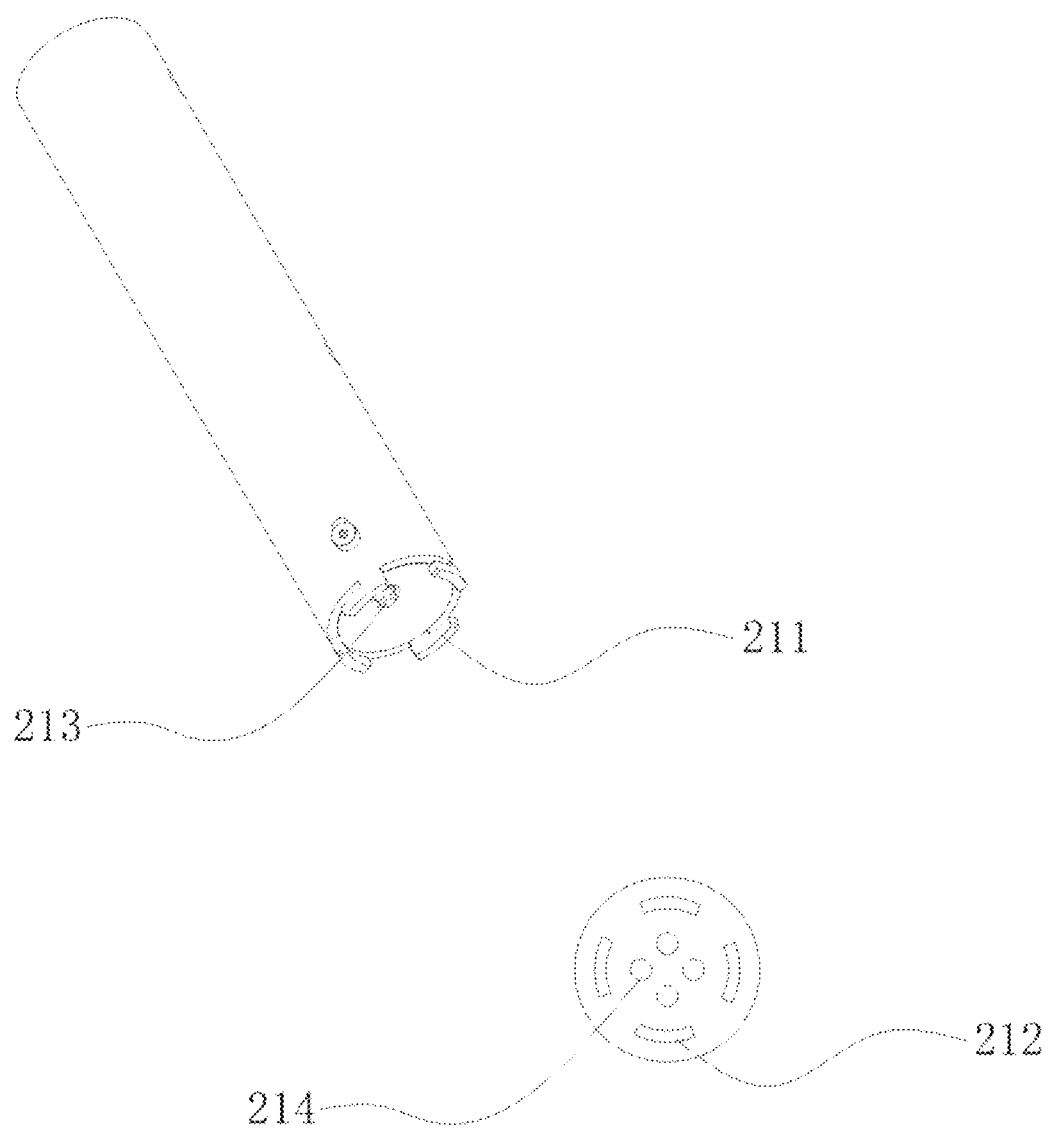
FIG. 25 is an exploded view of an embodiment in which a hook is used to serve as an anti-disengagement structure according to the present disclosure.
Figure 26:
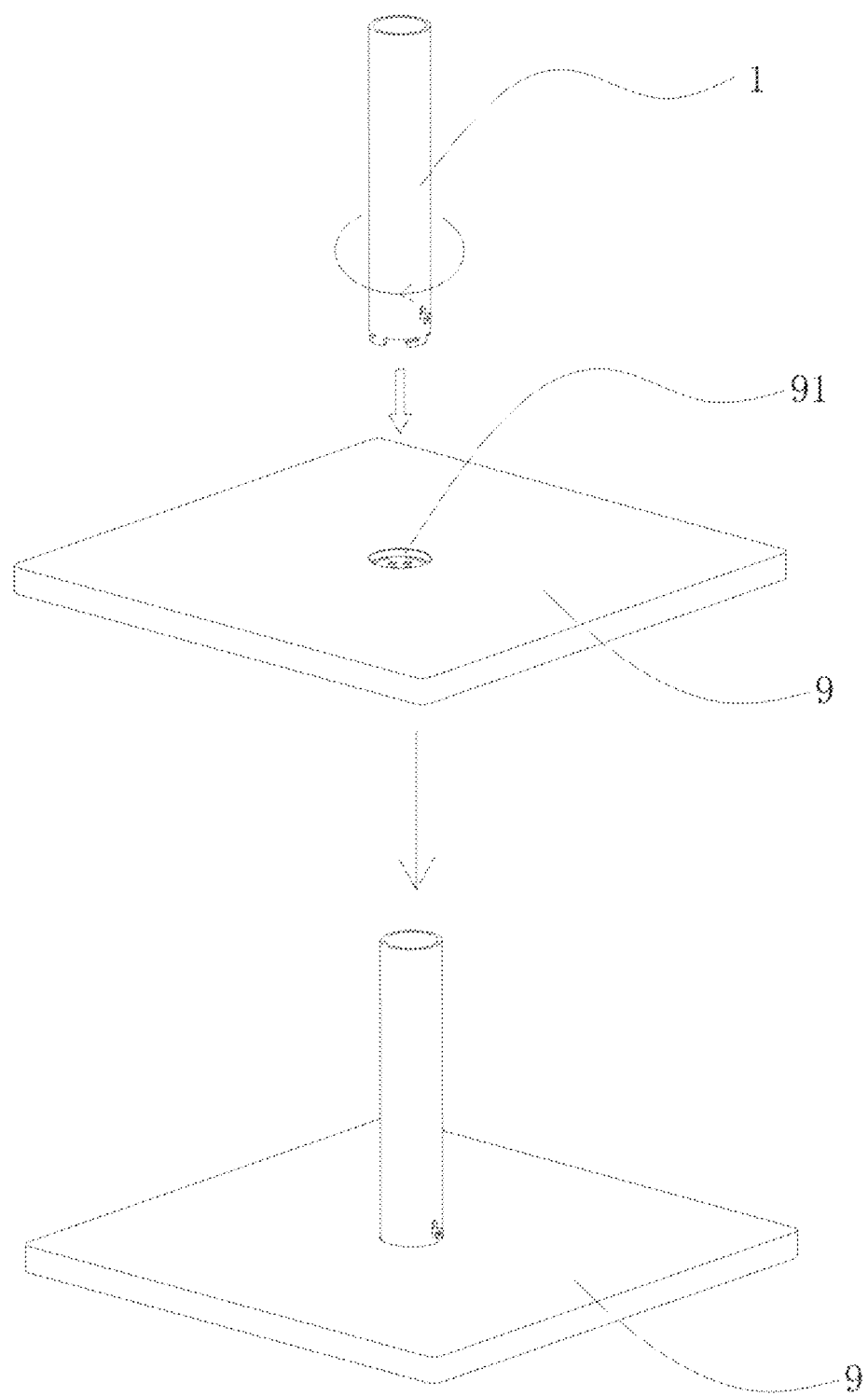
FIG. 26 is a schematic diagram of mounting a center pole of FIG. 25 to a base.

In some embodiments, as shown in FIG. 25-FIG. 26, the center pole fixing structure includes: a base 9 provided with a center hole 91; and a center pole 1 being a steel tube. A first anti-disengagement structure is disposed at an end of the center pole 1 inserted into the center hole 91. As shown in FIG. 25, the first anti-disengagement structure is a hook 211. A second anti-disengagement structure is disposed in the center hole 91 in the base 9. The second anti-disengagement structure is a fixing slot 212 adaptive to a hook 211 in terms of a shape structure. The fixing slot 212 and the hook 211 are connected to fix the center pole 1 to the base 9 by the cooperation of the fixing slot 212 and the hook 211 at the lower end of the center pole 1. The hook 211 may be welded on the center pole 1, may be integrally formed with the center pole 1, or may be detachably connected to the center pole 1.

A movable pin is disposed at the end of the center pole inserted into the center hole 91. In one of embodiments, the movable pin is an eccentric movable pin assembly 213 as shown in FIG. 25. The base 9 is correspondingly provided with an eccentric movable pin slot 214 for insertion of the eccentric movable pin assembly 213 after rotation of the center pole 1 to achieve a locking function.

Figure 27:
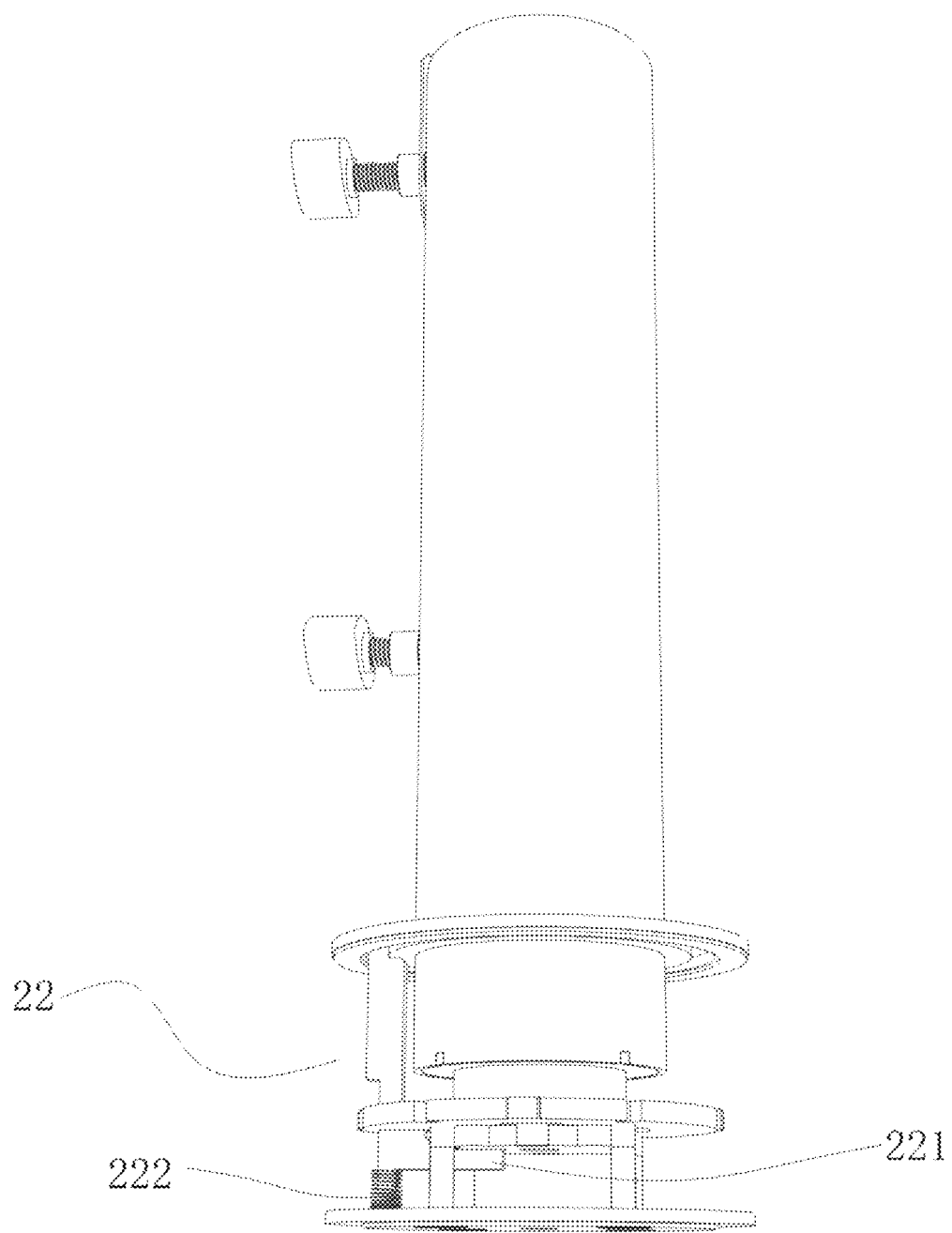
FIG. 27 is a schematic structural diagram showing that an eccentric elastic telescopic pin is used as a stopper according to the present disclosure.
Figure 28:
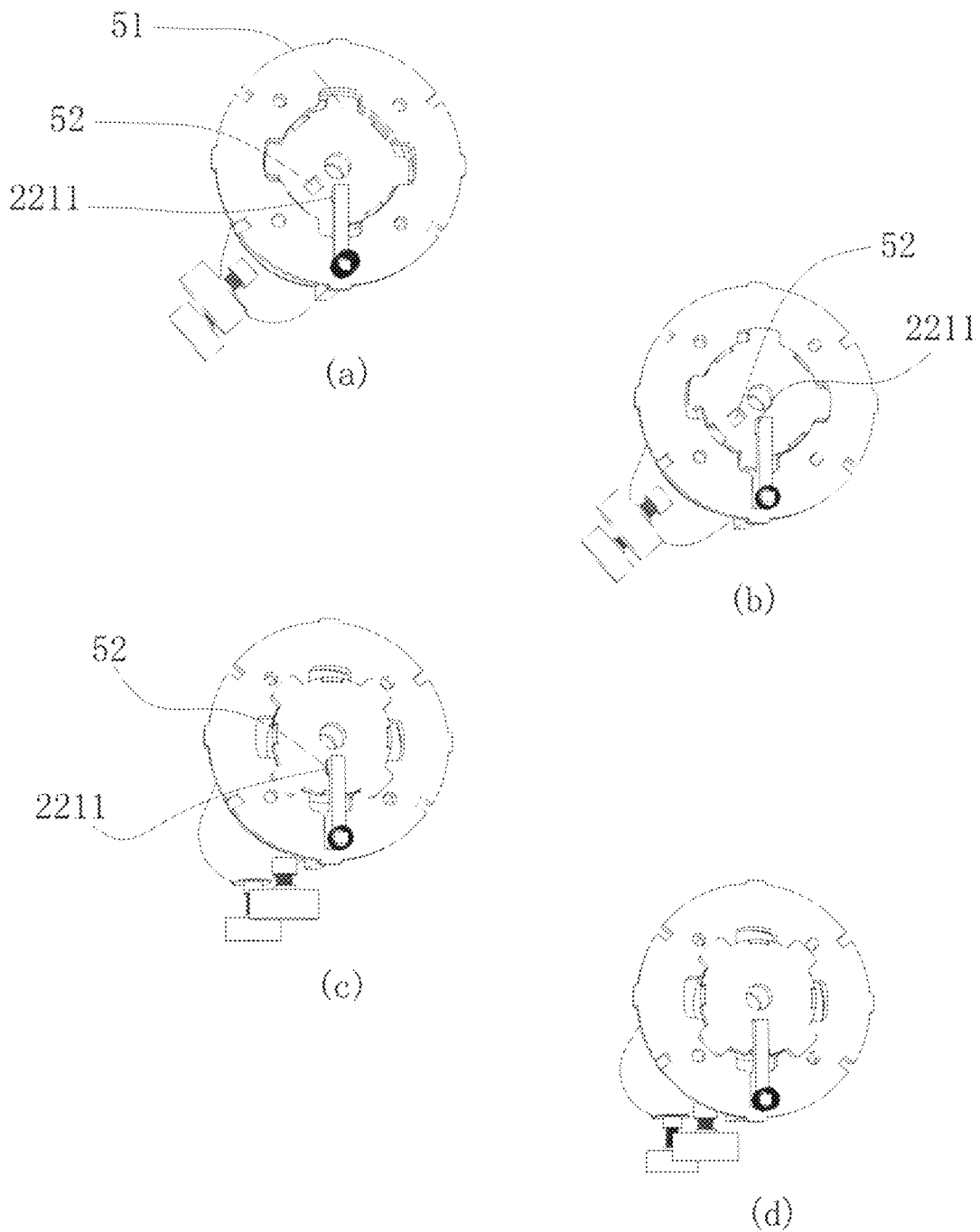
FIG. 28 is a diagram showing a locking process in FIG. 27.

In some embodiments, as shown in FIGS. 27-28, an elastic telescopic pin is an eccentric elastic telescopic pin assembly 22, including an eccentric elastic telescopic member 221 and a spring 222. The eccentric elastic telescopic member 221 protrudes towards a side of the anti-disengagement toothed ring 5 to form a fastener 2211 cooperating with the anti-disengagement toothed opening 52. The anti-disengagement catch 51 is pressed down to extrude the elastic telescopic member 221 after the anti-disengagement toothed ring 5 is inserted into the mounting block 17, as shown in (a) of FIG. 28. (b) of FIG. 28 shows that the anti-disengagement catch 51 further passes through the mounting block 17. (c) of FIG. 28 shows that the anti-disengagement catch 51 is rotated, and the anti-disengagement toothed opening 52 has approached the fastener 2211. (d) of FIG. 28 shows that the eccentric elastic telescopic member 221 is clamped into the anti-disengagement toothed opening 52 due to pushing of the spring 222, thereby completing the locking. In the case of unlocking, the eccentric elastic telescopic member 221 is pressed to disengage the fastener 2211 from the anti-disengagement toothed opening, and then the above steps are performed reversely to achieve unlocking.

Of course, one or more anti-disengagement toothed openings 52 may be provided.

In the description of the present disclosure, it needs to be understood that, the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise" and the like indicate an orientation or positional relationship based on the orientation or positional relationship shown in the drawings, and are only for facilitating the description of the present disclosure and simplifying the description, rather than indicating or implying that the device or element indicated must have a particular orientation, be constructed and operate in a particular orientation. Therefore, the terms should not be construed as limiting the present disclosure.

In the present disclosure, unless definitely specified and defined otherwise, a first feature being "above" or "below" a second feature may include that the first feature and the second feature are in direct contact or that the first feature and the second feature are not in direct contact but are in contact through another feature therebetween. Moreover, a first feature being "above", "over", and "on" a second feature includes that the first feature is right above and obliquely above the second feature, or only indicates that the first feature is at a higher level than the second feature. A first feature being "under", "below" and "beneath" a second feature includes that the first feature is right below and obliquely below the second feature, or only indicates that the first feature has a smaller height than the second feature.

In the description in this specification, the description of reference terms "one embodiment", "some embodiments", "an example", "a specific example", or "some examples" or the like means that particular features, structures, materials, or characteristics described in combination with the embodiment or example are included in at least one embodiment or example of the present disclosure. In this specification, illustrative description of the above terms should not be understood as necessarily referring to the same embodiment or example. Moreover, the specific features, structures, materials, or characteristics described may be combined in any one or more embodiments or examples in an appropriate manner. Furthermore, different embodiments or examples described in this specification may be joined and combined by those skilled in the art.

Although the embodiments of the present disclosure have been shown and described above, it will be appreciated that the above embodiments are illustrative and not to be construed as limiting the present disclosure. Those of ordinary skill in the art may make changes, modifications, substitutions, and variations to the above embodiments within the scope of the present disclosure.

What is claimed is:

1. A center pole fixing structure, comprising a center pole and a base, the base being provided with a center hole, and the center pole being inserted into the center hole to be fixed; wherein an anti-disengagement fixing structure is formed between the center pole and the base, achieves fixing by relative rotation of the center pole and the base, and constrains movement of the center pole in an axial direction thereof; a stopper for constraining the rotation of the center pole is disposed between the center pole and the base; and the stopper is a movable pin, and the movable pin is controlled to enter or exit, thereby locking or unlocking the relative rotation of the center pole and the base; and
   a flange ring is fixed at the outside of the center pole; a first flange is locked and fixed at the center hole in the base by a plurality of screws, and an inner diameter of the first flange cooperates with an outer diameter of the flange ring of the center pole.

2. The center pole fixing structure according to claim 1, wherein the anti-disengagement fixing structure is an anti-disengagement toothed ring and an anti-disengagement locking tab; the anti-disengagement toothed ring is provided with an anti-disengagement catch having a shape structure adaptive to a shape structure of the anti-disengagement locking tab.

3. The center pole fixing structure according to claim 2, wherein when the anti-disengagement locking tab is disposed on the base, the anti-disengagement toothed ring is disposed at an end of the center pole inserted into the center hole, and the anti-disengagement toothed ring is integrally formed or detachably connected with the center pole.

4. The center pole fixing structure according to claim 2, wherein the anti-disengagement toothed ring is integrally formed or detachably connected with the base when disposed on the base; and the anti-disengagement locking tab is disposed in an end surface or an inner cavity of a tube body of the center pole.

5. The center pole fixing structure according to claim 2, wherein an anti-movement device is cooperatively disposed between contact surfaces of the anti-disengagement toothed ring and the anti-disengagement locking tab.

6. The center pole fixing arrangement according to claim 5, wherein the anti-movement device is a wedge or a bump or a ridge disposed between the contact surfaces.

7. The center pole fixing structure according to claim 2, wherein a mounting block is disposed in the center hole of the base, and is provided with the stopper; the stopper is a hole or a slot; and the anti-disengagement toothed ring or the anti-disengagement locking tab is disposed at the center of the mounting block.

8. The center pole fixing structure according to claim 7, wherein a transition sleeve is embedded in the mounting block, and the transition sleeve is provided with a stopper mounting slot and a stop buckle; and at the same time, the mounting block is provided with a stop hole or slot into which the stop buckle is inserted to prevent rotation of the transition sleeve.

9. The center pole fixing structure according to claim 7, wherein a bottom plate of the mounting block is provided with an anti-wobbling ring.

10. The center pole fixing structure according to claim 7, wherein a spacer is disposed between the mounting block and the base.

11. The center pole fixing structure according to claim 7, wherein the hole or slot is formed in an end of the center pole connected to the base.

12. The center pole fixing structure according to claim 1, wherein the movable pin is an elastic telescopic pin, and the elastic telescopic pin is disposed on the base, and extends into a mating surface of the center pole and the base after the center pole and the base are in a rotation locking state to prevent the center pole and the base from rotation.

13. The center pole fixing structure according to claim 12, wherein the elastic telescopic pin is an eccentric elastic telescopic pin assembly.

14. The center pole fixing structure according to claim 1, wherein a support ring is disposed under the first flange, and an end surface of the support ring cooperates with an end surface of the flange ring.

15. The center pole fixing structure according to claim 14, wherein a compensatory backing ring is disposed under the support ring, and the compensatory backing ring employs an elastic material.

16. The center pole fixing structure according to claim 1, wherein the movable pin is a telescopic pin, and the base is provided with a sliding slot in which the movable pin slides.

17. The center pole fixing structure according to claim 1, wherein the center pole is provided with a first anti-disengagement structure that cooperates with a second anti-disengagement structure on the base to form the anti-disengagement fixing structure.

18. The center pole fixing structure according to claim 17, wherein the first anti-disengagement structure is a hook or a thread, and the second anti-disengagement structure has a shape structure adaptive to a shape structure of the first anti-disengagement structure.

19. The center pole fixing structure according to claim 17, wherein the movable pin is an eccentric movable pin assembly.

* * * * *